United States Patent [19]

Hasegawa et al.

[11] Patent Number: 5,305,147
[45] Date of Patent: Apr. 19, 1994

[54] EYEPIECE LENS SYSTEM FOR ENDOSCOPES

[75] Inventors: Akira Hasegawa; Tsutomu Igarashi; Shinichi Nakamura; Kimihiko Nishioka, all of Tokyo, Japan

[73] Assignee: Olympus Optical Co., Ltd., Tokyo, Japan

[21] Appl. No.: 747,007

[22] Filed: Aug. 19, 1991

[30] Foreign Application Priority Data

Aug. 20, 1990 [JP] Japan .................................. 2-216976
Mar. 4, 1991 [JP] Japan .................................. 3-061073
Apr. 16, 1991 [JP] Japan .................................. 3-109524

[51] Int. Cl.$^5$ .......................... G02B 9/10; G02B 9/14
[52] U.S. Cl. .................................. 359/644; 359/715; 359/787; 359/788
[58] Field of Search ............ 359/644, 645, 646, 715, 359/716, 717, 785, 786, 793, 775, 776, 787, 788

[56] References Cited

U.S. PATENT DOCUMENTS

| | | |
|---|---|---|
| 2,234,716 | 3/1941 | Wood .................................. 359/717 |
| 2,730,925 | 1/1956 | Kavanagh ............................ 359/717 |
| 3,905,686 | 9/1975 | Ruben .................................. 359/716 |
| 3,944,337 | 3/1976 | Ruben .................................. 359/716 |
| 4,105,308 | 8/1978 | Owen, Jr. et al. .................. 359/716 |
| 4,285,578 | 8/1981 | Yamashita et al. ................. 350/410 |
| 4,497,546 | 2/1985 | Kobayashi .......................... 359/644 |
| 4,593,984 | 6/1986 | Kimura et al. ..................... 359/646 |
| 5,034,763 | 7/1991 | Inabata ............................... 359/795 |
| 5,119,238 | 6/1992 | Igarashi ............................... 359/716 |
| 5,136,427 | 8/1992 | Sugawara ........................... 359/646 |

FOREIGN PATENT DOCUMENTS 60-18966 5/1985 Japan .

Primary Examiner—Paul M. Dzierzynski
Assistant Examiner—Jim Beyer
Attorney, Agent, or Firm—Cushman, Darby & Cushman

[57] ABSTRACT

An eyepiece lens system for endoscopes comprising a plurality of lens components and using at least one aspherical surface. This eyepiece lens system is composed of a small number of lens elements and has favorably corrected aberrations.

14 Claims, 27 Drawing Sheets

FRONT LENS UNIT
REAR LENS UNIT

FRONT LENS UNIT
REAR LENS UNIT

1st lens unit    2nd lens unit

1st lens unit    2nd lens unit

1st lens unit  2nd lens unit

EYEPIECE LENS SYSTEM FOR ENDOSCOPES

BACKGROUND OF THE INVENTION a) Field of the invention

The present invention relates to an eyepiece lens system which is to be used with endoscopes such as fiber scopes, non-flexible endoscopes and so on.

b) Description of the prior art

Eyepiece lens systems for endoscopes such as fiber scopes, which are to be used for observing and photographing end surfaces of image guides, must be designed so as to satisfy the requirements (a) through (c) mentioned below:

(a) Since an image guide has a numerical aperture of at least 0.3, eyepiece lens system must be, even when a light bundle converged by an objective lens system is incident on the image guide, compatible with a numerical aperture of at least 0.2 of an image guide.

(b) An image guide generally has a diameter of 3 mm or shorter and is equipped with 50 thousand or a smaller number of picture elements arranged thereon. Since picture elements are arranged in such a small number on the end surface of the image guide and a large field angle of an eyepiece lens system will undesirably make too remarkable the mesh pattern on the end surface of the image guide fiber bundle, a wide field angle is not required for an eyepiece lens system. However, an eyepiece lens system has a small field number not exceeding 3 and must have a magnification of at least 20× which is higher than that of an ordinary type eyepiece lens system.

(c) An eyepiece lens system must sufficiently resolve the mesh pattern on the end surface of an image guide or have resolution of 200 lines/mm on the end surface of an image guide.

In order to satisfy the requirements described above, it is necessary to design an eyepiece lens system for endoscopes such as fiber scopes so as to have a high magnification, a large numerical aperture and favorable optical performance.

As the conventional eyepiece lens systems for endoscopes which are designed so as to satisfy the above-mentioned requirements, there are known the lens system disclosed by Japanese Patent Kokoku Publication No. Sho 60-18966.

However, this conventional eyepiece lens system is composed of four lens components consisting of six lens elements, or comprises rather large a number of lens elements. Further, this lens system adopts a lens barrel which has complicated structure and requires tedious assembly works, and is therefore expensive.

SUMMARY OF THE INVENTION

A primary object of the present invention is to provide an eyepiece lens system which has aberrations corrected favorably over the entire range of a large numerical aperture and a relatively simple composition.

A first type of the eyepiece lens system for endoscopes according to the present invention comprises, in the order from the eye side, a first lens component having a positive refractive power, a second lens component having a negative refractive power and a third lens component having a positive refractive power, and uses at least one aspherical surface as a surface having a positive refractive power in the first lens component or the third lens component.

A second type of the eyepiece lens system for endoscopes according to the present invention comprises, in the order from the eye side, a first lens unit (front lens unit) which has an eye: side surface concave toward the eye side and an object side surface convex toward the object side, and a second lens unit (rear lens unit) which comprises a cemented lens component and has a positive refractive power, and uses at least one aspherical surface.

A third type of the eyepiece lens system for endoscopes according to the present invention comprises, in the order from the eye side, a first lens unit having a positive refractive power and a second lens unit having a negative refractive power, said second lens unit comprising a concave aspherical surface expressed by the formula shown below and designed so as to satisfy the following condition:

$$x = Cy^2/\{1 + \sqrt{1 - PC^2y^2}\} + By^2 + Ey^4 + Fy^6 + Gy^8$$

$$(N - N')A_n < 0 \text{ or } (N - N')B_n < 0, A_n = 0$$

In the formula mentioned above, the optical axis of the eyepiece lens system is taken as the x axis, the direction perpendicular to the optical axis is taken as the y axis and the intersection between the aspherical surface and the optical axis is taken as the origin on the coordinates, and the reference symbol C denotes the curvature of a spherical surface in contact with the aspherical surface on the optical axis (the reference sphere of the aspherical surface), the reference symbol P represents the conical coefficient, and the reference symbols B, E, F, G, ... designate the aspherical surface coefficients of the second, fourth, sixth, eighth, ... orders respectively. Further, in the condition mentioned above, the reference symbol N represents the refractive index of the medium located on the eye side of the aspherical surface, the reference symbol N' designates the refractive index of the medium arranged on the object side of the aspherical surface, the reference symbol $A_n$ denotes any one of the aspherical surface coefficients of the fourth and higher orders, and the reference symbol $B_n$ represents the aspherical surface coefficient of the second order.

A fourth type of the eyepiece lens system according to the present invention comprises, in the order from the eye side, a first lens unit having a positive refractive power, a second lens unit having a negative refractive power and a third lens unit having a positive refractive power, uses an aspherical surface expressed by the formula shown below and satisfying the following condition:

$$x = Cy^2/\{1 + \sqrt{1 - PC^2y^2}\} + By^2 + Ey^4 + Fy^6 + Gy^8 + \ldots$$

$$(N - N')A_n < 0$$

The eyepiece lens system for endoscopes according to the present invention will be described more detailedly below:

First, description will be made on the first type of the lens system.

The first type of the eyepiece lens system according to the present invention comprises, in the order from the eye side, a first lens component having a positive refractive power, a second lens component having a negative refractive power and a third lens component having a positive refractive power, and uses at least one aspherical surface as one of surfaces which have positive refractive powers and are arranged in the first lens component or the third lens component.

Out of the aberrations to be produced in an eyepiece lens system for endoscopes, the longitudinal chromatic aberration, lateral chromatic aberration, curvature of field and distortion can be corrected by composing the eyepiece lens system of three positive, negative and positive lens components. However, the negative spherical aberration and coma to be produced remarkably in the eyepiece lens system for endoscopes, which must have a large numerical aperture, cannot be corrected simply by the composition described above.

The eyepiece lens system for endoscopes according to the present invention has the composition described above and uses an aspherical surface for correcting mainly the negative spherical aberration and coma.

An aspherical surface has a shape which is generally expressed by the following formula (A):

$$x = Cy^2/\{1 + \sqrt{1 - PC^2y^2}\} + By^2 + Ey^4 + Fy^6 + Gy^8 + Hy^{10} + \ldots \quad (A)$$

wherein the reference symbols x and y represent values on a coordinates system which is determined by setting the optical axis as the x axis taking the direction toward the image point as positive, setting the intersection between the aspherical surface and the optical axis as the origin, and setting the straight line passing through the origin and perpendicular to the x axis as the y axis, the reference symbol C designates an inverse number of the radius of curvature of the circle in contact with the aspherical surface in the vicinity of the optical axis, the reference symbol P denotes the conical coefficient, and the reference symbols B, E, F, G, . . . represent the aspherical surface coefficients of the second, fourth, sixth, eighth, . . . orders.

When P has a value of 1 and all of B, E, F, G, . . . have a value of zero, the above-mentioned formula expresses a spherical surface.

Further, Seidel's aberration coefficients are defined by the formulae (i) and (ii) mentioned later as adopted by the universal lens design program ACCOS-V. When an object distance is represented by OB, a numerical aperture of the marginal ray is designated by NA and the refractive index of a medium existing on the object side of the first surface of the lens system is denoted by $n_o$, ACCOS-V determines height of ray $H_o$ as follows:

$$H_o = OB \times \tan\{\sin^{-1}(NA/n_o)\}$$

In contrast, the present invention determines the height of ray as:

$$H_o = OB \times NA/n_o$$

Accordingly, the present invention calculates the aberration coefficients through paraxial tracing on the basis of $H_o$ determined by the latter formula.

For meridional ray (x=0):

$$\Delta Y = (SA3)H^3 + (CMA3)YH^2 + \{3(AST3) + (PTZ3)\}Y^2H + (DIS3)Y^3 + (SA5)H^5 + (CMA5)YH^4 + (POBSA)Y^2H^3 + (ELCMA)Y^3H^2 + \{5(AST5) + (PTZ5)\}Y^4H + (DIS5)Y^5 + (SA7)H^7 \quad (i)$$

For sagittal ray (Y=0):

$$\Delta Z = (SA3)H^3 + \{(AST3) + (PTZ3)\}Z^2H + (SA5)H^5 + (SOBSA)Z^2H^3 + \{(AST5) + (PTZ5)\}Z^4H + (SA7)H^7 \quad (ii)$$

In the above-mentioned formula (i), the reference symbol $\Delta y$ represents a deviation between the paraxial image point (the image point when the lens system is free from aberrations) and an actual image point for the meridional ray, the reference symbol $\overline{Y}$ designates the location of incidence of the paraxial principal ray on the image surface normalized to the maximum image height and the reference symbol $\overline{H}$ denotes the location of incidence of the marginal ray on the pupil surface normalized to the pupil diameter. Further, the reference symbols SA3, SA5 and SA7 represent tangential spherical aberration of the third order, fifth order and seventh order respectively, the reference symbols CMA3 and CMA5 represent tangential coma of the third order and fifth order respectively, the reference symbols PTZ3 and PTZ5 designate Petzval's sum of the third order and fifth order respectively, the reference symbols DIS3 and DIS5 denote distortion of the third order and fifth order respectively, the reference symbol TOBSA represents oblique tangential spherical aberration of the fifth order, the reference symbol ELCMA designates elliptic coma of the fifth order, and the reference symbol SOBSA denotes oblique sagittal spherical aberration of the fifth order.

When an optional surface $r_i$ is designed as an aspherical surface in a lens system, the coefficient of the spherical aberration of the third order to be produced by this surface is expressed as follows:

$$SA3_i \propto \overline{H}_i^4 \cdot E_i \quad (iii)$$

wherein the reference symbol $E_i$ represents the aspherical surface coefficient of the fourth order.

Further, the coma of the third order is expressed as follows:

$$CMA3_i \propto \overline{H}_i^3 \cdot \overline{Y}_i \cdot E_i \quad (iv)$$

Furthermore, the astigmatism coefficient of the third order $AST3_i$ is expressed as follows:

$$AST3_i \propto \overline{H}_i^2 \cdot \overline{Y}_i^2 \cdot E_i \quad (v)$$

In the formulae (iv) and (v) mentioned above, the reference symbol $\overline{H}_i$ represents the maximum height of the paraxial principal ray on the surface $r_i$.

As is reasoned from the above-mentioned formulae (iii), (iv) and (v), an aspherical surface arranged at a location near the object to be observed will aggravate astigmatism since $Y_i$ is large at the location. Therefore, it is desirable to arrange an aspherical surface at a location which satisfies the following condition (1):

$$\overline{H}_i > \overline{Y}_i \quad (1)$$

Moreover, this aspherical surface should desirably be used as a surface having a positive refractive power because it is necessary to produce positive spherical aberration with this aspherical surface for correcting the strong negative spherical aberration produced by the lens system consisting only of spherical lens elements.

For the reason described above, the aspherical surface is designed so as to have a shape lowering curvature as the portions of said aspherical surface are farther from the optical axis when the aspherical surface is to be used as a surface having a positive refractive power or another shape enhancing curvature as the portions of said aspherical surface are farther from the optical axis when the aspherical surface is to be used as a surface having a negative refractive power, either surface being hardly manufacturable and undesirable.

"Lowering curvature" means reducing value of $|1/r|$ when radius of curvature is represented by r. The shape lowering curvature as the portions of said aspherical surface are farther from the optical axis is undesirable since it allows adverse influences to be given on the lens system due to eccentricity of the aspherical lens element, and obliges to impose stricter allowance on eccentricity and manufacturing precision of the lens barrel.

When the focal length of the aspherical lens element is represented by $f_A$, it is desirable that the focal length $f_A$ satisfies the following condition (2):

$$0.2 < f_A/f < 1.0 \tag{2}$$

wherein the reference symbol f represents the focal length of the eyepiece lens system as a whole.

The condition (2) clarifies a limit of manufacturability of the aspherical lens element. If the lower limit of the condition (2) is exceeded, the focal length $f_A$ will be too short, the aspherical surface will have too strong a positive refractive power and the second lens component must have too strong a negative refractive power accordingly, whereby strict allowance will be imposed on manufacturing precisions for the aspherical lens element and the second lens component. If the upper limit of the condition (2) is exceeded, in contrast, the aspherical surface coefficients will have values too large for the curvature of the reference sphere of the aspherical surface and the aspherical surface will have a point of inflection within the effective diameter thereof, whereby the aspherical surface will have a hardly manufacturable shape.

Moreover, when an aspherical surface is to be used in the third lens component, influence on astigmatism must be taken into consideration and, as is judged form the formula (5), it is desirable to design the aspherical surface so as to satisfy the following condition (3):

$$-0.002 < \Delta x_3/f < 0 \tag{3}$$

wherein the reference symbol $\Delta x_3$ represents the departure of the aspherical surface from the reference sphere thereof at the maximum height of the marginal ray on the aspherical surface to be used in the third lens component, the departure of the aspherical surface in the direction to lower curvature being taken as negative.

The condition (3) is required for determining the amount of spherical aberration to be corrected by the aspherical surface to be used in the third lens component.

When spherical aberration is to be corrected by the aspherical surface used in the first lens component, this lens component produces no influence on the astigmatism expressed by the formula (v) since the paraxial principal ray is low on the aspherical surface. However, the aspherical surface used in the third lens component produces influence on the astigmatism since the paraxial principal ray is high on the third lens component.

If the lower limit of the condition (3) is exceeded, the astigmatism will be unallowably aggravated. If the upper limit of the condition (3) is exceeded, in contrast, the spherical aberration will be undercorrected.

For satisfying the condition (3), it is desirable to use an aspherical surface as the eye side surface of the third lens component.

In the next place, it is proper to slightly differentiate shape of the aspherical surface to be used in the first lens component between two cases: one where only the first lens component uses an aspherical surface and the other where not only the first lens component but also another lens component, for example the third lens component, uses an aspherical surfaces.

In the case where only the first lens component uses an aspherical surface, it is desirable the departure $\Delta x_i$ of the aspherical surface from the reference sphere thereof as measured at the maximum height of the marginal ray on said surface satisfies the following condition (4):

$$-0.006 < \Delta x_1/f < 0 \tag{4}$$

Further, in the case where not only the first lens component but also the third lens component uses an aspherical surface, it is desirable that the departure $\Delta x_1$ satisfies the following condition (5):

$$-0.003 < \Delta x_1/f < 0.002 \tag{5}$$

If the upper limit of the condition (4) or (5) is exceeded, the spherical aberration will be undercorrected. If the lower limit of the condition (4) or (5) is exceeded, in contrast, the spherical aberration will be overcorrected.

Now, description will be made on the second type of the eyepiece lens system for endoscopes according to the present invention. The second type of the eyepiece lens system comprises, in the order from the eye side, a front lens unit which has an eye side surface concave toward the eye side and an object side surface convex toward the object side, and a rear lens unit which comprises a cemented doublet and has a positive focal length as a whole, and uses at least one aspherical surface in the lens system.

The second type of the eyepiece lens system for endoscopes according to the present invention is designed on an assumption that diopter is to be adjusted, for observation by naked eye, by adjusting the distance between the end surface of the image guide and the eyepiece lens system, and another imaging attachment lens system 5 is to be interposed, for photographing, between the eyepiece lens system and a film as illustrated in FIG. 51. When diopter of the eyepiece lens system is fixed at 0 diopter (the rays emerging from the eyepiece lens system are parallel with one another) for photographing, for example, defocusing and adverse influence due to eccentricity are not so remarkable in the condition where the eyepiece lens system is optically coupled with the attachment lens system 5, thereby allowing no remarkable adverse influence due to play in mechanical coupling. said diopter of the eyepiece lens system need not be strictly 0, but may be within a range of 0±5 diopter, since it is considered that the rays emerging from the eyepiece lens system are substantially parallel with one another and said adverse influence is little within the range of 0±5 diopter.

In addition, since an attachment lens system having a narrow field angle and a small numerical aperture and a simple composition is sufficient for use with the eyepiece lens system, aberrations can be corrected sufficiently favorably in the attachment lens system even when it has a simple composition. In order to obtain favorable imaging performance of the optical system as a whole which is composed by combining the eyepiece lens system with an attachment lens system, it is therefore sufficient to adopt an attachment lens system which has aberrations corrected in itself.

The second type of the eyepiece lens system for endoscopes according to the present invention is composed of a small number of lens elements, has a wide visual field at diopter in the vicinity of 0 diopter (for example, 0±5 diopter) and features sufficiently high imaging performance.

It is demanded, for an eyepiece lens system for use with fiber scopes and so on, to have a narrow field angle, a high magnification, a large numerical aperture and high imaging performance as already described above. Therefore, correction of distortion poses nearly no problem, but all the other aberrations influence on image contrast and must be corrected favorably. It is especially important to correct spherical aberration and coma in the eyepiece lens system.

Let us consider a condition where a ray coming from an object point located at infinite distance is incident on the eyepiece lens system having the composition described above.

In the second type of the eyepiece lens system according to the present invention, the boundary between the front lens unit and the rear lens unit is selected at the point where a ray which is allowed to be incident on the eyepiece lens system from the eye side in parallel to the optical axis becomes nearly parallel with the optical axis in the eyepiece lens system.

In the second type of the eyepiece lens system, the front lens unit has, from the viewpoint of the paraxial theory, a positive-negative power distribution, and should desirably be nearly afocal as a whole. Further, the rear lens unit has a positive power as a whole and a function to focus, on an object to be observed, a nearly parallel light bundle emerging from the front lens unit.

By selecting the composition described above, Petzval's sum is overcorrected in the front lens unit and undercorrected in the rear lens unit, whereby Petzval's sum is corrected with good balance in the eyepiece lens system as a whole. Furthermore, since the above-described composition allows to enhance, in the eyepiece lens system, the ray having passed through the marginal portion of the pupil, it is unnecessary to impart so strong a power to each lens surface, thereby making it possible to suppress astigmatism to be produced, and reduce variations of spherical aberration and coma to be caused by manufacturing variations of parts of the lens system.

Since the second type of the eyepiece lens system can be considered as the retrofocus type, it can have a sufficiently long back focal length, and allows the lens elements for composing the lens system to have sufficient thickness or to be manufactured easily in practice even when the lens system is designed so as to have a higher magnification (a shorter focal length).

In order to correct Petzval's sum more favorably in the second type of the eyepiece lens system, it is desirable to design the rear lens unit so as to have focal length $f_R$ satisfying the following condition (6):

$$1.2 < f_R/f < 3 \qquad (6)$$

If the lower limit of the condition (6) is exceeded, Petzval's sum will be undercorrected. If the upper limit of the condition (6) is exceeded, Petzval's sum will be overcorrected.

Moreover, it is desirable for favorable correction of Petzval's sum to design the front lens unit so as to satisfy the following condition (7):

$$0.4 < |f(n_o-1)/r_o| < 2 \qquad (7)$$

wherein the reference symbol $n_o$ represents the refractive index of the eye side lens element arranged in the front lens unit and the reference symbol $r_o$ designates the radius of curvature on the eye side surface of said eye side lens element.

If the upper limit of the condition (7) is exceeded, Petzval's sum will be overcorrected. If the lower limit of the condition (7) is exceeded, Petzval's sum will undesirably be undercorrected.

The cemented doublet used in the rear lens unit of the second type of the eyepiece lens system has a function to correct chromatic aberration.

In the light bundle emerging from the image guide, the ray parallel with the optical axis has the highest intensity and the rays having larger angles relative to the optical axis have lower intensities. Accordingly, it is general to design an eyepiece lens system so as to locate the pupil on the side of the image guide (object side) at nearly infinit distance. As a result, both longitudinal chromatic aberration and lateral chromatic aberration are undercorrected, except special cases, when light is allowed to be incident from the eye side on the eyepiece lens system.

In the second type of the eyepiece lens system according to the present invention which uses the front lens unit having the weak power, longitudinal chromatic aberration is not produced so much by the front lens unit and it is desirable to arrange the cemented doublet in the rear lens unit for correcting the longitudinal chromatic aberration. The lateral chromatic aberration should also be corrected desirably not in the front lens unit in which the principal ray is low and correcting efficiency is low, but in the rear lens unit in which the principal ray is high. For this reason, it is necessary to arrange the cemented lens component in the rear lens unit.

For correcting the longitudinal chromatic aberration and lateral chromatic aberration, it is desirable that the cemented doublet consists of a negative lens element having a high dispersing power and a positive lens element having a low dispersing power. Further, it is preferable to reserve a difference of at least 15 in Abbe's number between these two lens elements.

In addition, it is necessary for reducing number of the lens element required for composing the eyepiece lens system to use an aspherical surface.

Owing to the selection of the power distribution and the use of the cemented lens component described above, the second type of the eyepiece lens system according to the present invention is capable of correcting curvature of field, astigmatism and chromatic aberration, but the lens system cannot correct spherical aberration and coma sufficiently favorably.

When the eyepiece lens system is composed of a smaller number of lens elements, each refracting surface produces aberrations in larger amounts which can be corrected more difficultly. In case of the eyepiece lens system according to the present invention which has the narrow field angle and the large numerical aperture, the aberrations influenced dependently on value of the numerical aperture, i.e., spherical aberration and coma, can hardly be corrected.

In order to correct these aberrations, the present invention uses an aspherical surface expressed by the above-mentioned formula (A).

According to the aberration theory of the third order, the coefficient $\Delta I_i$ of the spherical aberration and the coefficient $\Delta II_i$ of the coma produced by an aspherical surface are expressed by the following formula (vi) and (vii) respectively using the aspherical surface coefficient of the fourth order as follows:

$$\Delta I_i = 8h_i^4 \cdot E_i \cdot (n_{i-1} - n_i) \quad \text{(vi)}$$

$$\Delta II_i = 8h_i^3 \cdot h_{ci} \cdot E_i (n_{i-1} - n_i) \quad \text{(vii)}$$

wherein the reference symbols $h_i$ and $h_{ci}$ represent the heights of the paraxial marginal ray and the paraxial principal ray respectively on the i'th surface, the reference symbol $n_{i-1}$ designates the refractive index of the medium located on the eye side of the aspherical surface, and the reference symbol $n_i$ denotes the refractive index of the medium located on the object side of the aspherical surface.

In the eyepiece lens system according to the present invention neither the marginal ray nor the principal ray intersects with the optical axis at the locations where the lens elements are arranged. Accordingly, both $h_i$ and $h_{ci}$ are always positive. Further, $n_{i-1} n_i$ has a positive value when the refractive index of the medium located on the eye side of the aspherical surface is higher than that of the medium located on the object side of the aspherical surface, and vice versa. The aspherical surface functions to overcorrect the spherical aberration and coma when the formulae (vi) and (vii) have positive values respectively, or undercorrect the aberrations when the formulae have negative values respectively.

The second type of the eyepiece lens system according to the present invention is apt to undercorrect both the spherical aberration and coma. Speaking more concretely, the spherical aberration is apt to be under-corrected due to the fact that the eyepiece lens system has the positive refractive power as a whole, and the coma is apt to be undercorrected due to the fact that the pupil is so arranged as to refract the outer marginal ray more strongly toward optical axis when are allowed to be incident from the eye side on the eyepiece lens system. For this reason, it is desirable that the aspherical surface to be used in the second type of the eyepiece lens system according to the present invention satisfies the following condition (8):

$$E_i(n_{i-1} - n_i) > 0 \quad (8)$$

When an aspherical surface satisfying the above-mentioned condition (8) is used in the eyepiece lens system, both $\Delta I_i$ and $\Delta II_i$ are larger than 0, and the aspherical surface has a function to overcorrect the spherical aberration and coma of the third order, whereby these aberrations can be corrected favorably in the eyepiece lens system as a whole. If the condition (8) is not satisfied, the spherical aberration and coma of the third order will be aggravated in the eyepiece lens system as a whole.

It is more desirable for the aspherical surface to satisfy the condition (9) mentioned below:

$$0.005 < E_i(n_{i-1} - n_i) \cdot f^3 < 0.5 \quad (9)$$

If the lower limit of the condition (9) is exceeded, the spherical aberration and coma will be undercorrected. If the upper limit of the condition (9) is exceeded, both the aberrations will undesirably be overcorrected.

In order to use the function of the aspherical surface described above more effectively, it is preferable to use the aspherical surface in place of a spherical surface which is in the condition described as (a) or (b) below:

(a) The marginal ray is relatively high on the spherical surface in the lens system.

(b) The aberration coefficients of the spherical aberration and coma of the third order on the spherical surface have undercorrected values.

The condition (a) is required for obtaining manufacturability of the aspherical surface.

As is judged from the formulae (vi) and (vii) mentioned above, smaller values of the aspherical surface coefficients are sufficient, for obtaining the same functions to correct the spherical aberration and coma, a surface which has larger value of $h_i$ relatively in the eyepiece lens system. Therefore, it is possible by using an aspherical surface in place of a spherical surface having the condition (a) to prevent the aspherical surface to have a shape which has a point of inflection or a large departure from the reference sphere thereof.

By using an aspherical surface in place of a spherical surface having the condition (b), it is possible to prevent optical performance of the eyepiece lens system from being degraded by variation in assembly of the aspherical lens in a lens barrel.

According to the aberration theory, it is important for designing and manufacturing a lens system to select small values of the aberration coefficients for the lens system as a whole and small absolute values of the individual refracting surfaces. When the individual refracting surfaces has the aberration coefficients of small values as described above, it is necessary to impose strict allowance on the lens elements, thereby making it difficult to manufacture the lens elements in practice.

Since the products of the aberration coefficients multiplied by the heights of the rays of the orders corresponding to the orders of the aberration coefficients represent the values of the actual aberrations, it is considered that variations of aberrations to be caused by variation of height of ray are determined dependently on values of the aberration coefficients. On the other hand, since all variations in curvature, eccentricities of lens elements as well as airspaces reserved therebetween are the factors which cause variations of heights of rays on individual lens surfaces, smaller absolute values of the coefficients of aberrations on the individual lens surfaces allow to reduce the variations of aberrations due to these factors and widen the allowance for lens elements.

For the second type of the eyepiece lens system according to the present invention, it is necessary to produce a function to overcorrect the spherical aberration and coma with the aspherical surface. For this reason, when the coefficients of the third order of the spherical aberration and coma to be produced by the reference sphere of the aspherical surface formula have overcorrected values, the total coefficients of the aberrations including the spherical aberration and coma to be produced by the aspherical surface have large absolute values, thereby obliging to narrow the range of the allowance for the lens elements and increasing manufacturing cost of the eyepiece lens system.

When the coefficients of the third order of the spherical aberration and coma to be produced by the reference sphere of the aspherical surface have undercorrected values, on the other hand, the aberration coefficients of the reference sphere are cancelled with those of the aspherical surface, thereby making it possible to reduce the absolute values of the total aberration coefficients of the aspherical surface and obtain an eyepiece lens system which is less influenced by variations of lens elements and a lens barrel.

For the second type of the eyepiece lens system according to the present invention, it is desirable to design the front lens unit so as to satisfy the condition (7), and use an aspherical surface as a surface which has a positive refractive power, and is apt to undercorrect the spherical aberration and coma. Further, it is effective to use an aspherical surface as a surface which has a strong positive refractive power.

When both the description given above and the condition (6) are taken into consideration, it is desirable to use an aspherical surface as the object side surface of the front lens unit or the eye side surface of the rear lens unit. This aspherical surface should desirably have a refractive power satisfying the following condition (10):

$$0.2 < f(n_i - n_{i-1})/r_i < 1.5 \tag{10}$$

wherein the reference symbol $r_i$ represents the radius of curvature on the reference sphere of said aspherical surface.

If the lower limit of the condition (10) is exceeded, said aspherical surface will have too weak a refractive power and too strong aberration correcting effect, or if the upper limit of the condition (10) is exceeded, the aspherical surface will have too weak aberration correcting effect, whereby it will undesirably be impossible to reduce the absolute value of the total aberration coefficients of the refractive surfaces in either case.

Now, the third type of the eyepiece lens system for endoscopes according to the present invention will be described below:

This lens system comprises, in the order from the eye side, a front lens unit having a positive refractive power and a rear lens unit comprising a surface having a negative refractive power, and uses a concave aspherical surface satisfying the following condition (11) or (14) in the rear lens unit.

$$(N - N')A_n < 0 \tag{11}$$

$$(N - N')B_n > 0 \tag{14}$$

wherein the reference symbols N and N' represent the refractive indices of media located on the eye side and the object side respectively of the aspherical surface, the reference symbol $A_n$ designates the value of any one of the aspherical surface coefficients E, F, G, ..., and the reference symbol $B_n$ denotes the value of the aspherical surface coefficient B.

The third type of the eyepiece lens system for endoscopes according to the present invention is composed of four lens components, i.e., in the order from the eye side, a first positive lens component, a second positive lens component, a third negative lens component and a fourth positive lens component. The first and second lens components compose a front lens unit, whereas the third and fourth lens components compose a rear lens unit. When the third lens component has an eye side surface which is convex toward the eye side, however, the boundary between the front lens unit and the rear lens unit is located within the third lens components.

When a lens system which has the composition similar to that of the eyepiece lens system according to the present invention and uses the positive lens component on the eye side adopts an aperture stop at the location on the eye side of the lens system, the offaxial ray is relatively high on the negative lens component. Since this negative lens component must have a strong power for reducing Petzval's sum, coma of the upper ray is overcorrected. In order to prevent this overcorrection of coma, it is necessary to use, as a concave surface of this negative lens component, an aspherical surface which has portions progressively weakening the diverging power for rays as said portions are farther from the optical axis.

In the third type of the eyepiece lens system for endoscopes according to the present invention, it is possible, by using such an aspherical surface on the negative lens component, to correct the positive coma of the upper ray and favorably correct the offaxial aberrations.

Further, it is desirable to design the eye side surface of the first lens component as an aspherical surface which has portions progressively weakening the converging power for the rays as said portions are farther from the optical axis in the direction perpendicular thereto.

Furthermore, it is desirable to design the aspherical surface to be used on the negative lens component so as to have portions which progressively weaken the diverging power for the rays as said portions are farther from the optical axis.

Owing to the aspherical surfaces which are arranged at the locations and have the shapes described above, the third type of the eyepiece lens system for endoscopes according to the present invention is capable of correcting the negative spherical aberration produced by the first positive lens component and having a high aperture ratio even when said lens system is composed of a small number of lens elements.

When an aspherical surface is to be used as another convex surface arranged at a location in the vicinity of the aperture stop, in the vicinity of the image guide or between the aperture stop and the image guide, it is desirable to design the aspherical surface so as to have portions progressively weakening the converging power for the rays as said portions are farther from the optical axis. However, since the aperture stop is located on the eye side of the lens system, said convex aspherical surface refracts the upper ray at a smaller angle and produces positive coma. Also for correcting this positive coma, it is necessary to design the aspherical surface to be used as the concave surface so as to have the portions progressively weakening the diverging power for the rays as said portions are farther form the optical axis. The portions weakening the diverging power for the rays must be arranged as the portions allowing passage of at least fractions of the rays higher than the principal ray of the offaxial rays.

Further, said aspherical surface to be used as the concave surface may have portions, in the vicinity of the optical axis, which inversely strengthen the diverging power for the rays as said portions are farther from the optical axis. These portions serve for correcting the negative spherical aberration produced by convex surfaces and, since the aspherical surface used as the concave surface is located far from the aperture stop, mainly the paraxial ray passes in the vicinity of the optical axis of this aspherical surface.

Let us assume that radius of a circle which is in contact with an aspherical surface at a point on the aspherical surface is represented by R, the refractive index of the medium located on the eye side of the aspherical surface is designated by N and the refractive index of the medium located on the object side of the aspherical surface is denoted by N' and the diverging power for the rays is strengthened as $(N-N')/R$ has value progressively enlarged. R is taken as positive when the center of the circle is located on the object side of the aspherical surface.

The shapes of the aspherical surfaces to be used in the third type of the eyepiece lens system according to the present invention are expressed by the above-mentioned formula (A).

The inverse number of the radius of the circle in contact with the aspherical surface at a point (x, y) on the aspherical surface is expressed by the following formula (B):

$$\frac{1}{R} = \frac{\frac{d^2x}{dy^2}}{\sqrt{1 + \left(\frac{dx}{dy}\right)^2}} \quad (B)$$

In the formula mentioned above, the second term $(dx/dy)^2$ in the radical sign in the denominator is the square of the inclination of the tangential line on the aspherical surface and has a value of 1 at largest, whereby the denominator has a value on the order of 1 to $\sqrt{2}$ which progressively varies along with variation of y. It is therefore considered that variation of curvature 1/R is determined almost by the denominator.

By differentiating the aspherical surface formula (A) twice, we obtain the following formula (C):

$$d^2x/dy^2 = C + 2B + 12Ey^2 + 30Fy^4 + 56Gy^6 + \ldots \quad (C)$$

Hence, when $N-N'$ is larger than 0 and $C+2B$ is larger than 0, the value of $d^2x/dy^2$ does not decrease and $(N-N')/R$ does not have the portions progressively weakening the diverging power for the rays unless any one of E, F, G, . . . is negative.

In case of the concave aspherical surface, $C+2B$ is always larger than 0 when $N-N'$ is larger than 0 and $C+2B$ is always smaller than 0 when $N-N'$ is smaller than 0.

As is understood from the foregoing description, the above-mentioned condition (11) defines the requisite for the concave aspherical surface to have the portions progressively weakening the diverging power for the rays.

Similarly, it is necessary for the aspherical surface having the convex shape to satisfy the following condition (12) when it is to have the portions progressively weakening the diverging power for the rays:

$$(N-N')A_p > 0 \quad (12)$$

wherein the reference symbol $A_p$ represents any one of the coefficients of the aspherical surface having the convex surface.

That is to say, the condition (12) means that at least one of the coefficients E, F, G, . . . should satisfy this condition.

Further, it is desirable for correcting spherical aberration that the aspherical surface having the convex surface satisfies the following condition (13):

$$0.0 < |E \cdot f^3| < 15 \quad (13)$$

If the lower limit of the condition (13) is exceeded, it will be impossible to correct the spherical aberration. If the upper limit of the condition (13) is exceeded, it will be difficult to correct the coma, and the lens elements will be thin at the marginal portions thereof and can hardly be manufactured in practice.

Next, when all of the coefficients E, F, G,... of the aspherical surface formula(A) have values of 0 and B is not zero, the denominator of the formula (A) increases monotonously as is seen from the formula (B) and the aspherical surface can have such a shape as to include the portions progressively weakening the diverging power for the rays by designing it so as to satisfy the above-mentioned condition (14).

Further, when the aspherical surface has the convex shape, this aspherical surface can have the shape which includes the portions progressively weakening the diverging power for the rays by selecting the coefficient B of the aspherical surface which satisfies the following condition (15):

$$(N-N')B_p < 0 \quad (15)$$

The foregoing description applies to the eyepiece lens system for endoscopes which is designed on the basis of Ernostar type, or composed of the front lens unit consisting of the first positive lens component and the second positive lens component, and the rear lens unit consisting of the third negative lens component and the fourth positive lens component, and uses the aspherical surface in the rear lens unit.

However, it is conceivable to design the third type of the eyepiece lens system for endoscopes according to the present invention as a lens system based on the triplet type or the fourth type of the eyepiece lens system according to the present invention. Speaking more concretely, the fourth type of the eyepiece lens system for endoscopes may comprise, in the order from the eye side, a positive lens component having a positive refractive power, a lens component having a negative refractive power and a lens component having a positive refractive power, and uses an aspherical surface therein. The aspherical surface should satisfy the conditions (11) and (14) when it is concave, or the conditions (12) and (15) when it is convex. Further, for correcting the aspherical aberration, it is desirable for the aspherical surface to satisfy the condition (13).

Figure 51:
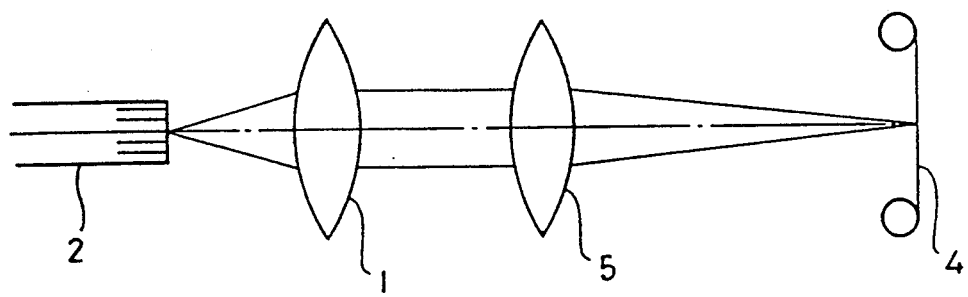
Figure 52:
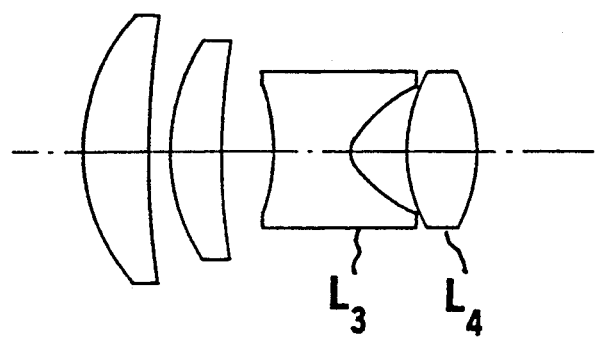
Figure 53:
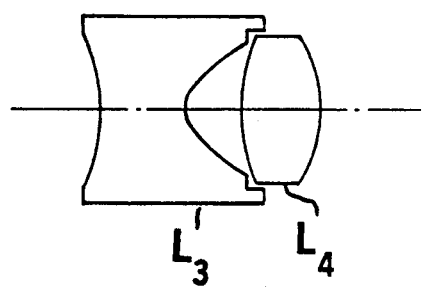
Figure 54:
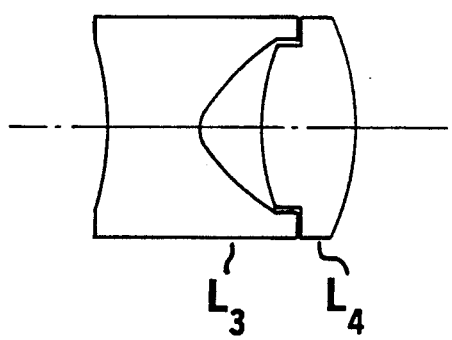

FIG. 26 through FIG. 50 show graphs illustrating aberration characteristics of the Embodiments 1 through 25 respectively of the present invention;

FIG. 51 shows a diagram illustrating a manner for switching the eyepiece lens system for endoscopes according to the present invention between the conditions for observation by naked eye and photographing; and FIG. 52 through FIG. 54 show sectional views illustrating the shapes of the aspherical surfaces to be used in the eyepiece lens system for endoscopes according to the present invention.

DETAILED DESCRIPTION OF THE PREFERRED EMBODIMENTS

Now, the eyepiece lens system for endoscopes according to the present invention will be described more detailedly below with reference to the preferred embodiments thereof illustrated in the accompanying drawings and given in the form of the following numerical data:

Embodiment 1
$f = 1.0$, $F/2.0$, $IH = 0.094$
object distance $= -63.9631$ $r_1 = \infty$
　　　$d_1 = 0.1282$　　$n_1 = 1.51633$　　$\nu_1 = 64.15$
$r_2 = \infty$
　　　$d_2 = 0.0385$
$r_3 = \infty$ (stop)
　　　$d_3 = 0.1282$
$r_4 = 0.3884$
(aspherical surface)
　　　$d_4 = 0.3047$　　$n_2 = 1.65830$　　$\nu_2 = 57.33$
$r_5 = -1.0356$
　　　$d_5 = 0.0244$
$r_6 = -0.6795$
　　　$d_6 = 0.0385$　　$n_3 = 1.59270$　　$\nu_3 = 35.29$
$r_7 = 0.2678$
　　　$d_7 = 0.2901$
$r_8 = 0.4946$
　　　$d_8 = 0.3845$　　$n_4 = 1.79952$　　$\nu_4 = 42.24$
$r_9 = 2.2779$
　　　$d_9 = 0.1923$
$r_{10} = \infty$
　　　$d_{10} = 0.1282$　　$n_5 = 1.51633$　　$\nu_5 = 64.15$
$r_{11} = \infty$ aspherical surface coefficient
$P = 1$
$E = -0.42505$, $F = -0.36369 \times 10$
$\overline{H}_i = \overline{H}_4 = 0.252$, $\overline{Y}_i = \overline{Y}_4 = 0.012$
$f_A/f = 0.469$, $\Delta x_3/f = -0.0026$

Embodiment 2
$f = 1.0$, $F/2.0$, $IH = 0.094$
object distance $= -63.8649$ $r_1 = \infty$
　　　$d_1 = 0.1280$　　$n_1 = 1.51633$　　$\nu_1 = 64.15$
$r_2 = \infty$
　　　$d_2 = 0.0384$
$r_3 = \infty$ (stop)
　　　$d_3 = 0.1280$
$r_4 = 0.4171$
　　　$d_4 = 0.2212$　　$n_2 = 1.72916$　　$\nu_2 = 54.68$
$r_5 = 22.4138$
　　　$d_5 = 0.0344$
$r_6 = -1.5753$
　　　$d_6 = 0.1836$　　$n_3 = 1.68893$　　$\nu_3 = 31.08$
$r_7 = 0.2829$
　　　$d_7 = 0.3280$
$r_8 = 0.3641$
(aspherical surface)
　　　$d_8 = 0.3838$　　$n_4 = 1.74100$　　$\nu_4 = 52.68$
$r_9 = 1.3769$
　　　$d_9 = 0.1920$
$r_{10} = \infty$
　　　$d_{10} = 0.1280$　　$n_5 = 1.51633$　　$\nu_5 = 64.15$
$r_{11} = \infty$ aspherical surface coefficient
$P = 1$
$E = -0.16534 \times 10$, $F = -0.14418 \times 10^2$
$\overline{H}_i = \overline{H}_8 = 0.142$, $\overline{Y}_i = \overline{Y}_8 = 0.087$
$f_A/f = 0.58$, $\Delta x_3/f = -0.0007$

Embodiment 3
$f = 1.0$, $F/2.2$, $IH = 0.086$
object distance $= -58.4288$ $r_1 = \infty$
　　　$d_1 = 0.1171$　　$n_1 = 1.51633$　　$\nu_1 = 64.15$
$r_2 = \infty$
　　　$d_2 = 0.0351$
$r_3 = \infty$ (stop)
　　　$d_3 = 0.1171$
$r_4 = 0.4435$
(aspherical surface)
　　　$d_4 = 0.2026$　　$n_2 = 1.69680$　　$\nu_2 = 56.49$
$r_5 = -1.6836$
　　　$d_5 = 0.0229$
$r_6 = -0.8947$
　　　$d_6 = 0.2566$　　$n_3 = 1.59270$　　$\nu_3 = 35.29$
$r_7 = 0.2588$
　　　$d_7 = 0.3196$
$r_8 = 0.3883$
(aspherical surface)
　　　$d_8 = 0.3512$　　$n_4 = 1.77250$　　$\nu_4 = 49.66$
$r_9 = 1.5162$
　　　$d_9 = 0.1756$
$r_{10} = \infty$
　　　$d_{10} = 0.1171$　　$n_5 = 1.51633$　　$\nu_5 = 64.15$
$r_{11} = \infty$ aspherical surface coefficient
4th surface ($r_4$)
$P = 1$
$E = -0.10359$, $F = 0.25947 \times 10$
8th surface ($r_8$)
$P = 1$
$E = -0.82089$, $F = 0.55043 \times 10$
$G = -0.16472 \times 10^3$
$\overline{H}_i = \overline{H}_4 = 0.230$, $\overline{Y}_i = \overline{Y}_4 = 0.011$
$\overline{H}_i = \overline{H}_8 = 0.117$, $\overline{Y}_i = \overline{Y}_8 = 0.087$
$f_A/f = 0.524$ (surface $r_4$), 0.595 (surface $r_8$)
$\Delta x_1/f = 0.0001$ (surface $r_4$),
$\Delta x_3/f = -0.0001$ (surface $r_8$)

Embodiment 4
$f = 1.0$, $F/2.0$, $IH = 0.094$
object distance $= -63.7860$ $r_1 = \infty$
　　　$d_1 = 0.1278$　　$n_1 = 1.51633$　　$\nu_1 = 64.15$
$r_2 = \infty$
　　　$d_2 = 0.0383$
$r_3 = \infty$ (stop)
　　　$d_3 = 0.1278$
$r_4 = 0.5566$
(aspherical surface)
　　　$d_4 = 0.3263$　　$n_2 = 1.69680$　　$\nu_2 = 56.49$
$r_5 = -1.6432$
　　　$d_5 = 0.0498$
$r_6 = -1.9278$
　　　$d_6 = 0.2739$　　$n_3 = 1.71736$　　$\nu_3 = 29.51$
$r_7 = 0.2558$
　　　$d_7 = 0.1191$
$r_8 = 0.5213$
　　　$d_8 = 0.3053$　　$n_4 = 1.72916$　　$\nu_4 = 54.68$
$r_9 = -0.2884$
　　　$d_9 = 0.0622$　　$n_5 = 1.53113$　　$\nu_5 = 62.44$
$r_{10} = -1.7160$
　　　$d_{10} = 0.1917$
$r_{11} = \infty$
　　　$d_{11} = 0.1278$　　$n_6 = 1.51633$　　$\nu_6 = 64.15$
$r_{12} = \infty$ aspherical surface coefficient
$P = 1$
$E = -0.37644$, $F = -0.18355 \times 10$
$\overline{H}_i = \overline{H}_4 = 0.251$, $\overline{Y}_i = \overline{Y}_4 = 0.012$ -continued $$f_A/f = 0.635, \quad \Delta x_1/f = -0.0019$$

Embodiment 5

$f = 1.0, \quad F/2.0, \quad IH = 0.094$
object distance = $-63.7832$

| | | | |
|---|---|---|---|
| $r_1 = \infty$ | | | |
| | $d_1 = 0.1278$ | $n_1 = 1.51633$ | $\nu_1 = 64.15$ |
| $r_2 = \infty$ | | | |
| | $d_2 = 0.0383$ | | |
| $r_3 = \infty$ (stop) | | | |
| | $d_3 = 0.1278$ | | |
| $r_4 = 0.5754$ (aspherical surface) | | | |
| | $d_4 = 0.3022$ | $n_2 = 1.65160$ | $\nu_2 = 58.52$ |
| $r_5 = -0.9433$ | | | |
| | $d_5 = 0.0271$ | | |
| $r_6 = -0.7932$ | | | |
| | $d_6 = 0.1897$ | $n_3 = 1.72342$ | $\nu_3 = 37.95$ |
| $r_7 = 0.5357$ | | | |
| | $d_7 = 0.1856$ | | |
| $r_8 = 0.7151$ (aspherical surface) | | | |
| | $d_8 = 0.1810$ | $n_4 = 1.64250$ | $\nu_4 = 58.37$ |
| $r_9 = -0.3711$ | | | |
| | $d_9 = 0.3834$ | $n_5 = 1.53256$ | $\nu_5 = 45.91$ |
| $r_{10} = -1.1241$ | | | |
| | $d_{10} = 0.1917$ | | |
| $r_{11} = \infty$ | | | |
| | $d_{11} = 0.1278$ | $n_6 = 1.51633$ | $\nu_6 = 64.15$ |
| $r_{12} = \infty$ | | | | aspherical surface coefficient
4th surface ($r_4$)
$P = 1$
$E = -0.83406 \times 10^{-1}, \quad F = -0.71059$
8th surface ($r_8$)
$P = 1$
$E = -0.13175 \times 10, \quad F = -0.35536 \times 10$
$\overline{H}_i = \overline{H}_4 = 0.251, \quad \overline{Y}_i = \overline{Y}_4 = 0.012$
$\overline{H}_i = \overline{H}_8 = 0.156, \quad \overline{Y}_i = \overline{Y}_8 = 0.064$
$f_A/f = 0.595$ (surface $r_4$), $0.688$ (surface $r_8$)
$\Delta x_1/f = -0.0005$ (surface $r_4$),
$\Delta x_3/f = -0.0008$ (surface $r_8$)

Embodiment 6

$f = 1.0, \quad F/2.0, \quad IH = 0.094$
object distance = $-63.7889$

| | | | |
|---|---|---|---|
| $r_1 = \infty$ | | | |
| | $d_1 = 0.1278$ | $n_1 = 1.51633$ | $\nu_1 = 64.15$ |
| $r_2 = \infty$ | | | |
| | $d_2 = 0.0383$ | | |
| $r_3 = \infty$ (stop) | | | |
| | $d_3 = 0.1278$ | | |
| $r_4 = 0.4975$ (aspherical surface) | | | |
| | $d_4 = 0.3835$ | $n_2 = 1.75700$ | $\nu_2 = 47.87$ |
| $r_5 = -1.8061$ | | | |
| | $d_5 = 0.0343$ | | |
| $r_6 = -0.8683$ | | | |
| | $d_6 = 0.1760$ | $n_3 = 1.78472$ | $\nu_3 = 25.71$ |
| $r_7 = 0.2846$ | | | |
| | $d_7 = 0.0680$ | | |
| $r_8 = 0.6002$ (aspherical surface) | | | |
| | $d_8 = 0.1428$ | $n_4 = 1.46450$ | $\nu_4 = 65.94$ |
| $r_9 = 0.3338$ | | | |
| | $d_9 = 0.3576$ | $n_5 = 1.78590$ | $\nu_5 = 44.18$ |
| $r_{10} = -0.9437$ | | | |
| | $d_{10} = 0.1917$ | | |
| $r_{11} = \infty$ | | | |
| | $d_{11} = 0.1278$ | $n_6 = 1.51633$ | $\nu_6 = 64.15$ |
| $r_{12} = \infty$ | | | | aspherical surface coefficient
4th surface ($r_4$)
$P = 1$
$E = -0.77444 \times 10^{-1}, \quad F = 0.33039$
8th surface ($r_8$)
$P = 1$
$E = -0.12277 \times 10, \quad F = -0.74199$
$\overline{H}_i = \overline{H}_4 = 0.251, \quad \overline{Y}_i = \overline{Y}_4 = 0.012$
$\overline{H}_i = \overline{H}_8 = 0.125, \quad \overline{Y}_i = \overline{Y}_8 = 0.053$
$f_A/f = 0.555$ (surface $r_4$), $0.464$ (surface $r_8$)

-continued $\Delta x_1/f = -0.0002$ (surface $r_4$),
$\Delta x_3/f = -0.0003$ (surface $r_8$)

Embodiment 7

$f = 1.0, \quad F/2.0, \quad IH = 0.094$
object distance = $-63.7790$

| | | | |
|---|---|---|---|
| $r_1 = \infty$ | | | |
| | $d_1 = 0.1278$ | $n_1 = 1.51633$ | $\nu_1 = 64.15$ |
| $r_2 = \infty$ | | | |
| | $d_2 = 0.0383$ | | |
| $r_3 = \infty$ (stop) | | | |
| | $d_3 = 0.1278$ | | |
| $r_4 = 0.4931$ (aspherical surface) | | | |
| | $d_4 = 0.3834$ | $n_2 = 1.77250$ | $\nu_4 = 49.66$ |
| $r_5 = -1.8279$ | | | |
| | $d_5 = 0.0414$ | | |
| $r_6 = -0.7719$ | | | |
| | $d_6 = 0.1655$ | $n_3 = 1.78472$ | $\nu_3 = 25.71$ |
| $r_7 = 0.2936$ | | | |
| | $d_7 = 0.0675$ | | |
| $r_8 = 0.7293$ (aspherical surface) | | | |
| | $d_8 = 0.1192$ | $n_4 = 1.46450$ | $\nu_4 = 65.94$ |
| $r_9 = 0.3209$ | | | |
| | $d_9 = 0.3175$ | $n_5 = 1.72000$ | $\nu_5 = 46.03$ |
| $r_{10} = -0.6700$ | | | |
| | $d_{10} = 0.1917$ | | |
| $r_{11} = \infty$ | | | |
| | $d_{11} = 0.1278$ | $n_6 = 1.51633$ | $\nu_6 = 64.15$ |
| $r_{12} = \infty$ | | | | aspherical surface coefficient
4th surface ($r_4$)
$P = 1$
$E = -0.79526 \times 10^{-1}, \quad F = 0.55132$
8th surface ($r_8$)
$P = 1$
$E = -0.22710 \times 10, \quad F = -0.27438 \times 10^2$
$\overline{H}_i = \overline{H}_4 = 0.251, \quad \overline{Y}_i = \overline{Y}_4 = 0.012$
$\overline{H}_i = \overline{H}_8 = 0.120, \quad \overline{Y}_i = \overline{Y}_8 = 0.053$
$f_A/f = 0.542$ (surface $r_4$), $0.468$ (surface $r_8$)
$\Delta x_1/f = -0.0001$ (surface $r_4$),
$\Delta x_3/f = -0.0005$ (surface $r_8$)

Embodiment 8

$f = 1, \quad 2\omega = 11.3°, \quad NA = 0.25,$
object distance = $-54.4863$

| | | | |
|---|---|---|---|
| $r_1 = \infty$ | | | |
| | $d_1 = 0.1092$ | $n_1 = 1.51633$ | $\nu_1 = 64.15$ |
| $r_2 = \infty$ | | | |
| | $d_2 = 0.0328$ | | |
| $r_3 = \infty$ (stop) | | | |
| | $d_3 = 0.2531$ | | |
| $r_4 = -0.6590$ | | | |
| | $d_4 = 0.6264$ | $n_2 = 1.56732$ | $\nu_2 = 42.83$ |
| $r_5 = -1.1094$ | | | |
| | $d_5 = 0.4549$ | $n_3 = 1.56384$ | $\nu_3 = 60.69$ |
| $r_6 = -0.8985$ (aspherical surface) | | | |
| | $d_6 = 0.0546$ | | |
| $r_7 = 0.9809$ | | | |
| | $d_7 = 0.7585$ | $n_4 = 1.69680$ | $\nu_4 = 55.52$ |
| $r_8 = -0.8405$ | | | |
| | $d_8 = 0.1638$ | $n_5 = 1.84666$ | $\nu_5 = 23.78$ |
| $r_9 = 8.8781$ | | | |
| | $d_9 = 0.8241$ | | |
| $r_{10} = \infty$ | | | |
| | $d_{10} = 0.1092$ | $n_6 = 1.51633$ | $\nu_6 = 64.15$ |
| $r_{11} = \infty$ | | | |
| | $d_{11} = 0.0437$ | | |
| $r_{12} = \infty$ (image surface) | | | | aspherical surface coefficient
$E = 0.75495 \times 10^{-1}, \quad F = 0.50191 \times 10^{-1},$
$G = -0.42012 \times 10^{-1}, \quad H = -0.12395 \times 10^{-1}$
$f_R/f = 1.892, \quad |f(n_0 - 1)/r_0| = 0.861,$
$E_i(n_{i-1} - n_i) \cdot f^3 = 0.0426, \quad f(n_i - n_{i-1})/r_i = 0.628$

Embodiment 9

$f = 1, \quad 2\omega = 11.32°, \quad NA = 0.25,$
object distance = $-54.4863$

-continued

| | | | |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ | | |
| $r_3 = \infty$ (stop) | $d_3 = 0.0530$ | | |
| $r_4 = -0.6608$ | $d_4 = 0.6455$ | $n_2 = 1.55690$ | $\nu_2 = 48.55$ |
| $r_5 = \infty$ | $d_5 = 0.4793$ | $n_3 = 1.56384$ | $\nu_3 = 60.69$ |
| $r_6 = -0.9077$ (aspherical surface) | $d_6 = 0.5844$ | | |
| $r_7 = 0.9891$ | $d_7 = 0.8438$ | $n_4 = 1.69680$ | $\nu_4 = 55.52$ |
| $r_8 = -0.8909$ | $d_8 = 0.1638$ | $n_5 = 1.84666$ | $\nu_5 = 23.78$ |
| $r_9 = 9.6072$ | $d_9 = 0.7154$ | | |
| $r_{10} = \infty$ | $d_{10} = 0.1092$ | $n_6 = 1.51633$ | $\nu_6 = 64.15$ |
| $r_{11} = \infty$ | $d_{11} = 0.0437$ | | |
| $r_{12} = \infty$ (image surface) | | | | aspherical surface coefficient
$P = 1.0000$, $E = 0.83508 \times 10^{-1}$,
$F = 0.65042 \times 10^{-1}$, $G = -0.15073 \times 10^{-1}$,
$H = 0.11191$
$f_R/f = 1.843$, $|f(n_o - 1)/r_o| = 0.843$,
$E/(n_{i-1} - n_i) \cdot f^3 = 0.0471$, $f(n_i - n_{i-1})/r_i = 0.621$

Embodiment 10
$f = 1$, $2\omega = 11.3°$ $NA = 0.25$,
object distance $= -54.4863$

| | | | |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ | | |
| $r_3 = \infty$ (stop) | $d_3 = 0.3510$ | | |
| $r_4 = -0.5963$ | $d_4 = 0.1092$ | $n_2 = 1.56732$ | $\nu_2 = 42.83$ |
| $r_5 = -6.6179$ | $d_5 = 0.3171$ | | |
| $r_6 = -5.5417$ | $d_6 = 0.3275$ | $n_3 = 1.56384$ | $\nu_3 = 60.69$ |
| $r_7 = -0.7719$ (aspherical surface) | $d_7 = 0.0546$ | | |
| $r_8 = 0.9459$ | $d_8 = 0.9219$ | $n_4 = 1.69680$ | $\nu_4 = 55.52$ |
| $r_9 = -0.7531$ | $d_9 = 0.1092$ | $n_5 = 1.84666$ | $\nu_5 = 23.78$ |
| $r_{10} = 6.6822$ | $d_{10} = 0.6886$ | | |
| $r_{11} = \infty$ | $d_{11} = 0.1092$ | $n_6 = 1.51633$ | $\nu_6 = 64.15$ |
| $r_{12} = \infty$ | $d_{12} = 0.0437$ | | |
| $r_{13} = \infty$ (image surface) | | | | aspherical surface coefficient
$P = 1.0000$, $E = 0.11852$, $F = 0.15839$,
$G = 0.13569 \times 10^{-2}$, $H = 0.46469$
$f_R/f = 1.832$, $|f(n_o - 1)/r_o| = 0.951$,
$E/(n_{i-1} - n_i) \cdot f^3 = 0.0668$, $f(n_i - n_{i-1})/r_i = 0.730$

Embodiment 11
$f = 1$, $2\omega = 11.3°$ $NA = 0.25$,
object distance $= -54.4863$

| | | | |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ | | |
| $r_3 = \infty$ (stop) | $d_3 = 0.3953$ | | |
| $r_4 = -0.5932$ | $d_4 = 0.1092$ | $n_2 = 1.59551$ | $\nu_2 = 39.21$ |
| $r_5 = -1.0432$ | $d_5 = 0.2478$ | | |
| $r_6 = -1.9181$ | $d_6 = 0.3275$ | $n_3 = 1.56384$ | $\nu_3 = 60.69$ |
| $r_7 = -0.7955$ (aspherical surface) | $d_7 = 0.0546$ | | |
| $r_8 = 0.9607$ | $d_8 = 0.7936$ | $n_4 = 1.69680$ | $\nu_4 = 55.52$ |
| $r_9 = -0.7639$ | $d_9 = 0.1638$ | $n_5 = 1.84666$ | $\nu_5 = 23.78$ |
| $r_{10} = -265.4730$ | $d_{10} = 0.5864$ | | |
| $r_{11} = \infty$ | $d_{11} = 0.1092$ | $n_6 = 1.51633$ | $\nu_6 = 64.15$ |
| $r_{12} = \infty$ | $d_{12} = 0.0437$ | | |
| $r_{13} = \infty$ (image surface) | | | | aspherical surface coefficient
$P = 1.0000$, $E = 0.95855 \times 10^{-1}$,
$F = 0.81375 \times 10^{-1}$, $G = -0.43031 \times 10^{-1}$,
$H = 0.55031$
$f_R/f = 1.673$, $|f(n_o - 1)/r_o| = 1.004$,
$E/(n_{i-1} - n_i) \cdot f^3 = 0.0540$, $f(n_i - n_{i-1})/r_i = 0.709$

Embodiment 12
$f = 1$, $2\omega = 11.3°$ $NA = 0.25$,
object distance $= -54.4863$

| | | | |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ | | |
| $r_3 = \infty$ (stop) | $d_3 = 0.3893$ | | |
| $r_4 = -0.6106$ | $d_4 = 0.1092$ | $n_2 = 1.59551$ | $\nu_2 = 39.21$ |
| $r_5 = -2.3783$ | $d_5 = 0.3249$ | | |
| $r_6 = -3.2740$ | $d_6 = 0.2184$ | $n_3 = 1.56384$ | $\nu_3 = 60.69$ |
| $r_7 = -0.7581$ (aspherical surface) | $d_7 = 0.0546$ | | |
| $r_8 = 0.9312$ | $d_8 = 0.8972$ | $n_4 = 1.69680$ | $\nu_4 = 55.52$ |
| $r_9 = -0.7136$ | $d_9 = 0.1092$ | $n_5 = 1.84666$ | $\nu_5 = 23.78$ |
| $r_{10} = 23.4404$ | $d_{10} = 0.6314$ | | |
| $r_{11} = \infty$ | $d_{11} = 0.1092$ | $n_6 = 1.51633$ | $\nu_6 = 64.15$ |
| $r_{12} = \infty$ | $d_{12} = 0.0437$ | | |
| $r_{13} = \infty$ (image surface) | | | | aspherical surface coefficient
$P = 1.0000$, $E = 0.12335$, $F = 0.14981$,
$G = 0.68161 \times 10^{-2}$, $H = 0.56258$
$f_R/f = 1.664$, $|f(n_o - 1)/r_o| = 0.975$,
$E/(n_{i-1} - n_i) \cdot f^3 = 0.0695$, $f(n_i - n_{i-1})/r_i = 0.744$

Embodiment 13
$f = 1$, $2\omega = 11.3°$ $NA = 0.25$,
object distance $= -54.4863$

| | | | |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ | | |
| $r_3 = \infty$ (stop) | $d_3 = 0.1628$ | | |
| $r_4 = -0.6757$ | $d_4 = 1.2618$ | $n_2 = 1.56384$ | $\nu_2 = 60.69$ |
| $r_5 = -0.8856$ (aspherical surface) | $d_5 = 0.0546$ | | |
| $r_6 = 0.7580$ | $d_6 = 0.6928$ | $n_3 = 1.48749$ | $\nu_3 = 70.20$ |
| $r_7 = -0.8900$ | $d_7 = 0.1638$ | $n_4 = 1.84666$ | $\nu_4 = 23.78$ |
| $r_8 = -6.5093$ | $d_8 = 0.8810$ | | |
| $r_9 = \infty$ | | | |

-continued

|  |  |  |  |
|---|---|---|---|
| $r_{10} = \infty$ | $d_9 = 0.1092$ | $n_5 = 1.51633$ | $\nu_5 = 64.15$ |
|  | $d_{10} = 0.0437$ |  |  |
| $r_{11} = \infty$ (image surface) |  |  |  | aspherical surface coefficient
$P = 1.0000, \quad E = 0.96681 \times 10^{-1},$
$F = 0.80841 \times 10^{-1}, \quad G = -0.16032$
$f_R/f = 2.235, \quad |f(n_o - 1)/r_o| = 0.834,$
$\Sigma_i(n_{i-1} - n_i) \cdot f^3 = 0.0545, \quad f(n_i - n_{i-1})/r_i = 0.637$ Embodiment 14
$f = 1, \quad 2\omega = 11.2° \quad NA = 0.3,$
object distance $= -54.4863$

|  |  |  |  |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ |  |  |
| $r_3 = \infty$ (stop) | $d_3 = 0.1886$ |  |  |
| $r_4 = -0.5546$ | $d_4 = 0.1092$ | $n_2 = 1.58215$ | $\nu_2 = 42.09$ |
| $r_5 = \infty$ | $d_5 = 0.4017$ | $n_3 = 1.56384$ | $\nu_3 = 60.69$ |
| $r_6 = -0.6915$ (aspherical surface) | $d_6 = 1.0115$ |  |  |
| $r_7 = 2.1613$ | $d_7 = 0.3275$ | $n_4 = 1.69680$ | $\nu_4 = 55.52$ |
| $r_8 = -3.0779$ | $d_8 = 0.0546$ |  |  |
| $r_9 = 0.8343$ | $d_9 = 0.4367$ | $n_5 = 1.72916$ | $\nu_5 = 54.68$ |
| $r_{10} = -1.1417$ | $d_{10} = 0.1092$ | $n_6 = 1.76182$ | $\nu_6 = 26.55$ |
| $r_{11} = 0.6380$ | $d_{11} = 0.5188$ |  |  |
| $r_{12} = \infty$ | $d_{12} = 0.1092$ | $n_7 = 1.51633$ | $\nu_7 = 64.15$ |
| $r_{13} = \infty$ |  |  |  | aspherical surface coefficient
$P = 1.0000, \quad E = 0.11538, \quad F = 0.23258,$
$G = 0.40527 \times 10^{-1}, \quad H = -0.68627 \times 10^{-1}, \quad I = 0.64654 \times 10,$
$f_R/f = 1.379, \quad |f(n_o - 1)/r_o| = 1.050,$
$\Sigma_i(n_{i-1} - n_i) \cdot f^3 = 0.0651, \quad f(n_i - n_{i-1})/r_i = 0.815$ Embodiment 15
$f = 1.000, \quad F/1.672, \quad IH = 0.0983,$
object distance $= -54.4863$

|  |  |  |  |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.328$ |  |  |
| $r_3 = \infty$ (stop) | $d_3 = 0.3072$ |  |  |
| $r_4 = 0.5741$ (aspherical surface) | $d_4 = 0.1638$ | $n_2 = 1.56384$ | $\nu_2 = 60.69$ |
| $r_5 = 2.9484$ | $d_5 = 0.0109$ |  |  |
| $r_6 = 0.6842$ | $d_6 = 0.1012$ | $n_3 = 1.77250$ | $\nu_3 = 49.66$ |
| $r_7 = 2.1681$ | $d_7 = 0.1381$ |  |  |
| $r_8 = -1.4457$ | $d_8 = 0.0686$ | $n_4 = 1.78472$ | $\nu_4 = 25.71$ |
| $r_9 = 0.3278$ (aspherical surface) | $d_9 = 0.1451$ |  |  |
| $r_{10} = 0.6337$ | $d_{10} = 0.1529$ | $n_5 = 1.81600$ | $\nu_5 = 46.62$ |
| $r_{11} = -0.7932$ | $d_{11} = 0.3082$ |  |  |
| $r_{12} = \infty$ | $d_{12} = 0.1092$ | $n_6 = 1.51633$ | $\nu_6 = 64.15$ |
| $r_{13} = \infty$ |  |  |  | aspherical surface coefficient
(4th surface)
$P = 1.0000, \quad B = 0.85679 \times 10^{-1},$
$E = -0.11641, \quad F = -0.17381$ (9th surface)
$P = 1.0000, \quad B = 0.38324, \quad E = 0.27672,$
$F = -0.11852 \times 10^2, \quad G = -0.31226 \times 10^3$
$R_n = 0.3104$ Embodiment 16
$f = 1.000, \quad F/1.667, \quad IH = 0.1054,$
object distance $= -54.4863$

|  |  |  |  |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ |  |  |
| $r_3 = \infty$ (stop) | $d_3 = 0.3415$ |  |  |
| $r_4 = 0.6480$ (aspherical surface) | $d_4 = 0.1896$ | $n_2 = 1.56384$ | $\nu_2 = 60.69$ |
| $r_5 = -2.5470$ | $d_5 = 0.0164$ |  |  |
| $r_6 = 0.6075$ | $d_6 = 0.1247$ | $n_3 = 1.77250$ | $\nu_3 = 49.66$ |
| $r_7 = 2.0186$ | $d_7 = 0.1051$ |  |  |
| $r_8 = -6.6491$ | $d_8 = 0.1326$ | $n_4 = 1.78472$ | $\nu_4 = 25.71$ |
| $r_9 = 0.4179$ (aspherical surface) | $d_9 = 0.1886$ |  |  |
| $r_{10} = 0.6515$ | $d_{10} = 0.1431$ | $n_5 = 1.81600$ | $\nu_5 = 46.62$ |
| $r_{11} = -0.9017$ | $d_{11} = 0.2522$ |  |  |
| $r_{12} = \infty$ | $d_{12} = 0.1092$ | $n_6 = 1.51633$ | $\nu_6 = 64.15$ |
| $r_{13} = \infty$ |  |  |  | aspherical surface coefficient
(4th surface)
$P = 1.0000, \quad B = -0.21734, \quad E = -0.76653,$
$F = -0.78593$
(9th surface)
$P = 1.0000, \quad B = 0.93468, \quad E = 0.10451 \times 10.$
$F = -0.78903 \times 10, \quad G = -0.52001 \times 10^2$
$R_n = 0.5107$ Embodiment 17
$f = 1.000, \quad F/1.670, \quad IH = 0.1054,$
object distance $= -54.4863$

|  |  |  |  |
|---|---|---|---|
| $r_1 = \infty$ | $d_1 = 0.1092$ | $n_1 = 1.51633$ | $\nu_1 = 64.15$ |
| $r_2 = \infty$ | $d_2 = 0.0328$ |  |  |
| $r_3 = \infty$ (stop) | $d_3 = 0.2965$ |  |  |
| $r_4 = 0.7016$ (aspherical surface) | $d_4 = 0.1474$ | $n_2 = 1.56384$ | $\nu_2 = 60.69$ |
| $r_5 = -2.6379$ | $d_5 = 0.0249$ |  |  |
| $r_6 = 0.7577$ | $d_6 = 0.1203$ | $n_3 = 1.77250$ | $\nu_3 = 49.66$ |
| $r_7 = 3.0230$ | $d_7 = 0.1180$ |  |  |
| $r_8 = 4.3009$ | $d_8 = 0.1959$ | $n_4 = 1.78472$ | $\nu_4 = 25.71$ |
| $r_9 = 0.3072$ (aspherical surface) | $d_9 = 0.1196$ |  |  |
| $r_{10} = 0.4708$ | $d_{10} = 0.3251$ | $n_5 = 1.81600$ | $\nu_5 = 46.62$ |
| $r_{11} = -0.9871$ | $d_{11} = 0.1492$ |  |  |
| $r_{12} = \infty$ | $d_{12} = 0.1092$ | $n_6 = 1.51633$ | $\nu_6 = 64.15$ |
| $r_{13} = \infty$ |  |  |  | aspherical surface coefficient
(4th surface)
$P = 1.0000, \quad B = -0.17841, \quad E = -0.84992,$
$F = -0.52490$
(9th surface)
$P = 1.0000, \quad B = 0.80087, \quad E = -0.72249,$
$F = -0.22192 \times 10^2, \quad G = -0.38172 \times 10^2$ -continued $R_n = 0.34501$

Embodiment 18
$f = 1.000$, F/1.671, IH = 0.0983,
object distance = −54.4863

$r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.2650$
$r_4 = 0.6955$
$d_4 = 0.1638$  $n_2 = 1.77250$  $\nu_2 = 49.66$
$r_5 = 1.2332$
$d_5 = 0.0109$
$r_6 = 0.5771$
$d_6 = 0.1058$  $n_3 = 1.77250$  $\nu_3 = 49.66$
$r_7 = 1.6165$
$d_7 = 0.1184$
$r_8 = -1.4820$
$d_8 = 0.0724$  $n_4 = 1.78472$  $\nu_4 = 25.71$
$r_9 = 0.3388$
(aspherical surface)
$d_9 = 0.1402$
$r_{10} = 0.6913$
(aspherical surface)
$d_{10} = 0.1747$  $n_5 = 1.81600$  $\nu_5 = 46.62$
$r_{11} = -0.7409$
$d_{11} = 0.4512$
$r_{12} = \infty$
$d_{12} = 0.1092$  $n_6 = 1.51633$  $\nu_6 = 64.15$
$r_{13} = \infty$ aspherical surface coefficient
(9th surface)
$P = 1.0000$, $B = 0.13088$, $E = -0.20566$,
$F = -0.22734 \times 10^2$, $G = -0.21482 \times 10^3$
(10th surface)
$P = 1.0000$, $E = -0.18427$, $F = -0.63202$,
$G = -0.98348 \times 10$
$R_n = 0.3112$

Embodiment 19
$f = 1.000$, F/1.680, IH = 0.0983,
object distance = −54.4863

$r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.1445$
$r_4 = 0.7108$
$d_4 = 0.1638$  $n_2 = 1.77250$  $\nu_2 = 49.66$
$r_5 = 1.7585$
$d_5 = 0.0109$
$r_6 = 0.5412$
$d_6 = 0.0969$  $n_3 = 1.77250$  $\nu_3 = 49.66$
$r_7 = 1.6611$
$d_7 = 0.1100$
$r_8 = -1.3951$
$d_8 = 0.0721$  $n_4 = 1.78472$  $\nu_4 = 25.71$
$r_9 = 0.3428$
(aspherical surface)
$d_9 = 0.1278$
$r_{10} = 0.6973$
$d_{10} = 0.1529$  $n_5 = 1.81600$  $\nu_5 = 46.62$
$r_{11} = -0.7982$
$d_{11} = 0.3917$
$r_{12} = \infty$
$d_{12} = 0.1092$  $n_6 = 1.51633$  $\nu_6 = 64.15$
$r_{13} = \infty$ aspherical surface coefficient
$P = 1.0000$, $B = 0.27246$, $E = -0.34953$,
$F = -0.26636 \times 10^2$, $G = -0.16276 \times 10^3$
$R_n = 0.2888$

Embodiment 20
$f = 1.000$, F/1.986, IH = 0.0983,
object distance = −54.4863

$r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.1873$
$r_4 = 0.5268$
$d_4 = 0.3446$  $n_2 = 1.81600$  $\nu_2 = 46.62$
$r_5 = -14.2110$
$d_5 = 0.0804$
$r_6 = -0.9811$
$d_6 = 0.1710$  $n_3 = 1.78472$  $\nu_3 = 25.71$
$r_7 = 0.3197$
(aspherical surface)
$d_7 = 0.1648$
$r_8 = 0.7936$
(aspherical surface)
$d_8 = 0.0568$  $n_4 = 1.62004$  $\nu_4 = 36.25$
$r_9 = 0.3089$
$d_9 = 0.2771$  $n_5 = 1.77250$  $\nu_5 = 49.66$
$r_{10} = -0.6738$
$d_{10} = 0.2103$
$r_{11} = \infty$
$d_{11} = 0.1092$  $n_6 = 1.51633$  $\nu_6 = 64.15$
$r_{12} = \infty$ aspherical surface coefficient
(7th surface)
$P = 1.0000$, $E = 0.20401 \times 10$,
$F = -0.16321 \times 10^2$, $G = -0.16976 \times 10^3$,
$H = -0.86042 \times 10^4$
(8th surface)
$P = 1.0000$, $E = -0.12482 \times 10$, $F = 0.29849 \times 10$,
$G = -0.54810 \times 10^3$
$R_n = 0.3197$

Embodiment 21
$f = 1.000$, F/1.984, IH = 0.0983,
object distance = −54.5220

$r_1 = \infty$
$d_2 = 0.1093$  $n_1 = 1.51633$  $\nu_1 = 64.15$
$r_2 = \infty$
$d_2 = 0.0328$
$r_3 = \infty$ (stop)
$d_3 = 0.1874$
$r_4 = 0.5155$
$d_4 = 0.3540$  $n_2 = 1.81600$  $\nu_2 = 46.62$
$r_5 = 5.9527$
$d_5 = 0.0877$
$r_6 = -1.4600$
$d_6 = 0.1012$  $n_3 = 1.80518$  $\nu_3 = 25.43$
$r_7 = 0.3358$
(aspherical surface)
$d_7 = 0.1917$
$r_8 = 0.9554$
(aspherical surface)
$d_8 = 0.0569$  $n_4 = 1.63980$  $\nu_4 = 34.48$
$r_9 = 0.3868$
$d_9 = 0.2773$  $n_5 = 1.78800$  $\nu_5 = 47.38$
$r_{10} = -0.6534$
$d_{10} = 0.2420$
$r_{11} = \infty$
$d_{11} = 0.1093$  $n_6 = 1.51633$  $\nu_6 = 64.15$
$r_{12} = \infty$ aspherical surface coefficient
(7th surface)
$P = 1.0000$, $E = 0.30726 \times 10$,
$F = 0.35434 \times 10^2$, $G = 0.10294 \times 10^5$,
$H = -0.29264 \times 10^5$
(8th surface)
$P = 1.0000$, $E = -0.74764$,
$F = 0.16156 \times 10^2$, $G = -0.25125 \times 10^3$
$R_n = 0.3358$

Embodiment 22
$f = 1.000$, F/1.992, IH = 0.0983,
object distance = −54.4863

$r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.0546$
$r_4 = 0.5458$ -continued $r_5 = 1.2445$
$d_4 = 0.2566$  $n_2 = 1.83481$  $\nu_2 = 42.72$
$d_5 = 0.1172$
$r_6 = -3.5415$
$d_6 = 0.2511$  $n_3 = 1.78472$  $\nu_3 = 25.71$
$r_7 = 0.4498$
(aspherical surface)
$d_7 = 0.2346$
$r_8 = 0.5075$
(aspherical surface)
$d_8 = 0.0601$  $n_4 = 1.59270$  $\nu_4 = 35.29$
$r_9 = 0.3057$
$d_9 = 0.3166$  $n_5 = 1.77250$  $\nu_5 = 49.66$
$r_{10} = -2.7580$
$d_{10} = 0.2293$
$r_{11} = \infty$
$d_{11} = 0.1092$  $n_6 = 1.51633$  $\nu_6 = 64.15$
$r_{12} = \infty$ aspherical surface coefficient
(7th surface)
$P = 1.0000$, $E = 0.10378 \times 10$,
$F = -0.11594 \times 10^3$, $G = 0.65714 \times 10^4$,
$H = -0.10869 \times 10^6$
(8th surface)
$P = 1.0000$, $E = -0.19306 \times 10$,
$F = -0.27782 \times 10^2$, $G = 0.86751 \times 10^3$,
$H = -0.11425 \times 10^5$
$R_n = 0.4498$ Embodiment 23
$f = 1.000$, $F/1.672$, $IH = 0.0983$,
object distance $= -54.4863$ $r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.0305$
$r_4 = 0.4661$
$d_4 = 0.2839$  $n_2 = 1.78800$  $\nu_2 = 47.38$
$r_5 = 5.6929$
$d_5 = 0.1092$
$r_6 = -0.9910$
$d_6 = 0.0590$  $n_3 = 1.80518$  $\nu_3 = 25.43$
$r_7 = 0.3040$
(aspherical surface)
$d_7 = 0.1041$
$r_8 = 0.6358$
(aspherical surface)
$d_8 = 0.0655$  $n_4 = 1.62004$  $\nu_4 = 36.25$
$r_9 = 0.3699$
$d_9 = 0.4006$  $n_5 = 1.81600$  $\nu_5 = 46.62$
$r_{10} = -0.6394$
$d_{10} = 0.2780$
$r_{11} = \infty$
$d_{11} = 0.1092$  $n_6 = 1.51633$  $\nu_6 = 64.15$
$r_{12} = \infty$ aspherical surface coefficient
(7th surface)
$P = 1.0000$, $B = -0.31901 \times 10^{-1}$,
$E = 0.21346 \times 10$, $F = -0.20335 \times 10^2$
(8th surface)
$P = 1.0000$, $B = -0.23806$, $E = -0.86414$,
$F = -0.58444 \times 10$
$R_n = 0.3100$ Embodiment 24
$f = 1.000$, $F/1.993$, $IH = 0.0985$,
object distance $= -54.6055$ $r_1 = \infty$
$d_1 = 0.1094$  $n_1 = 1.51633$  $\nu_1 = 64.15$
$r_2 = \infty$
$d_2 = 0.0328$
$r_3 = \infty$ (stop)
$d_3 = 0.1302$
$r_4 = 0.7148$
$d_4 = 0.2794$  $n_2 = 1.74063$  $\nu_2 = 38.66$
$r_5 = -4.1529$
$d_5 = 0.1588$
$r_6 = -0.7011$
(aspherical surface)
$d_6 = 0.0210$  $n_3 = 1.78472$  $\nu_3 = 30.16$
$r_7 = 0.5091$
$d_7 = 0.2485$  $n_4 = 1.62691$  $\nu_4 = 53.71$
$r_8 = -0.8309$
$d_8 = 0.1918$
$r_9 = 6.2047$
(aspherical surface)
$d_9 = 0.2702$  $n_5 = 1.58680$  $\nu_5 = 52.34$
$r_{10} = -0.8147$
$d_{10} = 0.2244$
$r_{11} = \infty$
$d_{11} = 0.1094$  $n_6 = 1.51633$  $\nu_6 = 64.15$
$r_{12} = \infty$ aspherical surface coefficient
(6th surface)
$P = 1.0000$, $E = 0.86909$,
$F = -0.30035 \times 10^2$, $G = 0.48596 \times 10^3$
(9th surface)
$P = 1.0000$, $E = -0.32710 \times 10$,
$F = 0.10877 \times 10^3$, $G = -0.20495 \times 10^4$
$R_n = -0.7011$ Embodiment 25
$f = 1.000$, $F/1.671$, $IH = 0.0983$,
object distance $= -54.4863$ $r_1 = \infty$
$d_1 = 0.1092$  $n_1 = 1.51633$  $\nu_1 = 64.15$
$r_2 = \infty$
$d_2 = 0.0328$
$r_3 = \infty$ (stop)
$d_3 = 0.0304$
$r_4 = 0.4679$
$d_4 = 0.3354$  $n_2 = 1.83481$  $\nu_2 = 42.72$
$r_5 = -6.7372$
$d_5 = 0.0333$
$r_6 = -1.4889$
$d_6 = 0.0746$  $n_3 = 1.80518$  $\nu_3 = 25.43$
$r_7 = 0.3029$
(aspherical surface)
$d_7 = 0.1453$
$r_8 = 0.5620$
(aspherical surface)
$d_8 = 0.0372$  $n_4 = 1.62004$  $\nu_4 = 36.25$
$r_9 = 0.3405$
$d_9 = 0.3202$  $n_5 = 1.78800$  $\nu_5 = 47.38$
$r_{10} = -0.7743$
$d_{10} = 0.2666$
$r_{11} = \infty$
$d_{11} = 0.1092$  $n_6 = 1.51633$  $\nu_6 = 64.15$
$r_{12} = \infty$ aspherical surface coefficient
(7th surface)
$P = 1.0000$, $B = 0.51302 \times 10^{-2}$,
$E = 0.34568 \times 10$, $F = 0.58839 \times 10^2$
(8th surface)
$P = 1.0000$, $B = -0.55062$, $E = 0.12187$,
$F = 0.14403 \times 10^2$
$R_n = 0.302$ wherein the reference symbols $r_1$, $r_2$, ... represent the radii of curvature on the surfaces of the respective lens elements, the reference symbols $d_1$, $d_2$, ... designate the thicknesses of the respective lens elements and the airspaces reserved therebetween, the reference symbols $n_1$, $n_2$, ... denote the refractive indices of the respective lens elements, and the reference symbols $\nu_1$, $\nu_2$, ... represent the Abbe's numbers of the respective lens elements.

Figure 1:
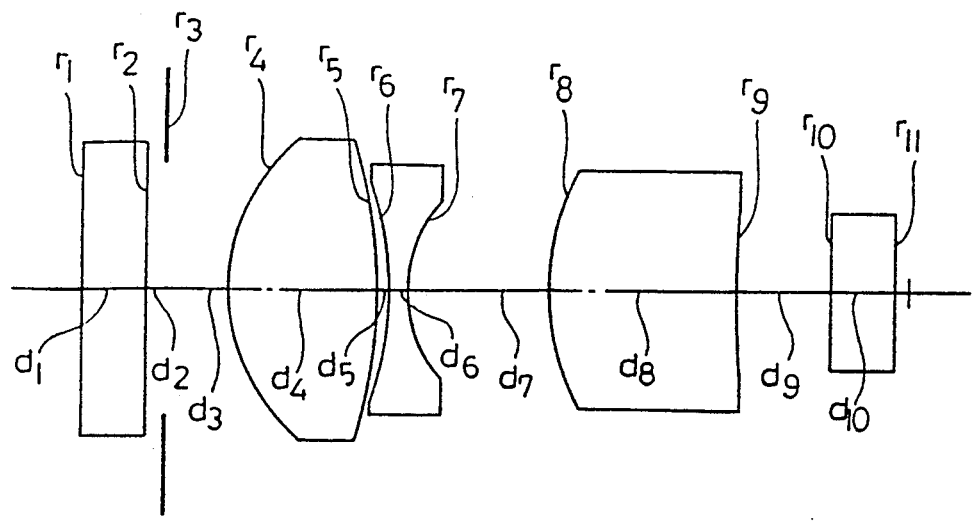
FIG. 1 through FIG. 25 show sectional views illustrating compositions of Embodiments 1 through 25 respectively of the eyepiece lens system for endoscopes according to the present invention.

The Embodiment 1 has the composition illustrated in FIG. 1, wherein the positive refracting surface ($r_4$) of the first lens component is designed as an aspherical surface for favorably correcting spherical aberration and coma. Further, the final surface ($r_9$) is concave toward the object side for correcting astigmatism.

Figure 2:
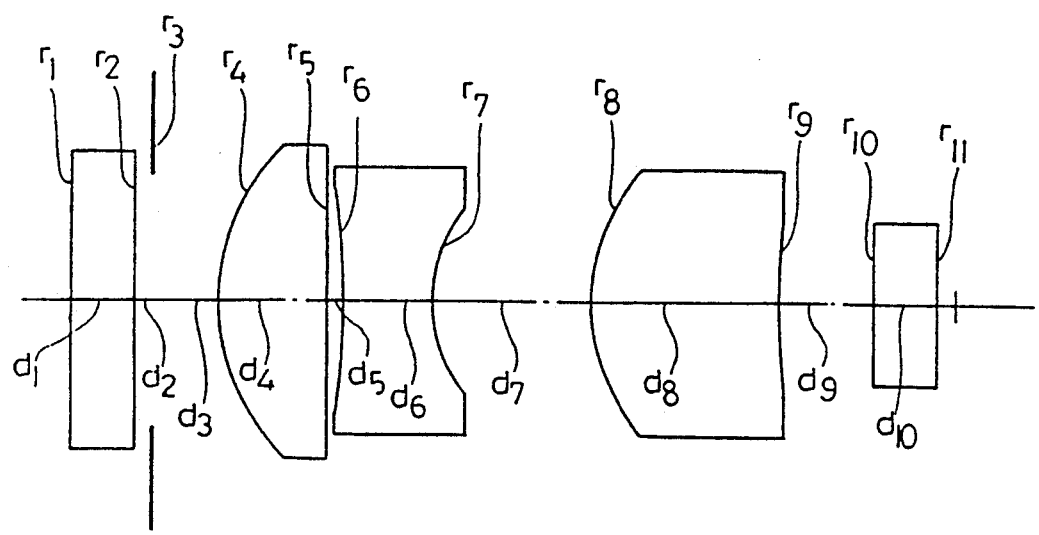

The Embodiment 2 has the composition illustrated in FIG. 2, wherein the positive refracting surface ($r_8$) of the third lens component is designed as an aspherical surface for correcting spherical aberration and coma. Further, curvature is enhanced in the vicinity of the optical axis of the aspherical surface for correcting positive astigmatism, the final surface ($r_9$) is concave toward the object side and the aspherical surface satisfies the condition (4).

Figure 3:
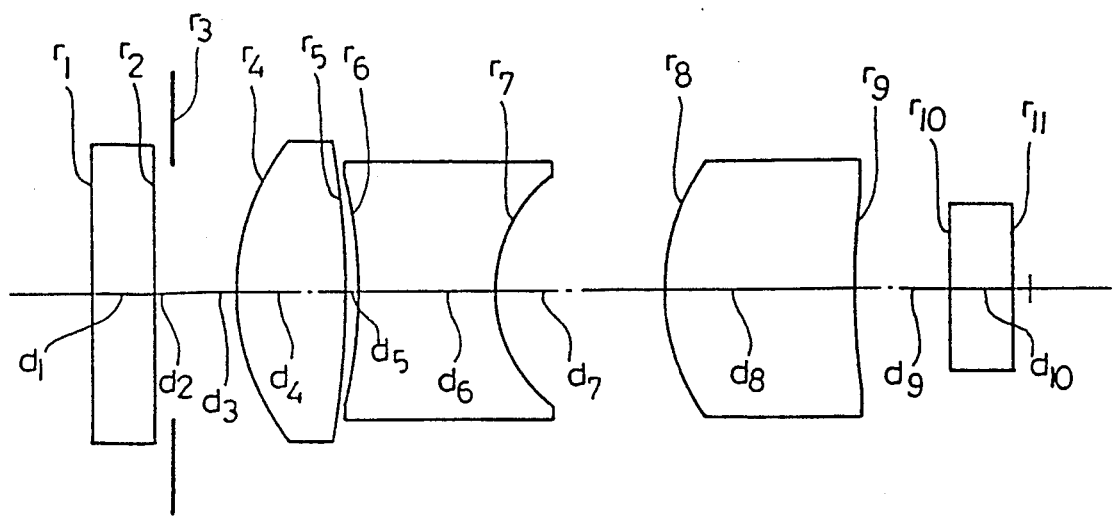

The Embodiment 3 has the composition illustrated in FIG. 3, wherein the positive refracting surfaces ($r_4$ and $r_8$) of the first lens component and the third lens component are designed as aspherical surfaces respectively. The aspherical surface used in the first lens component serves for correcting spherical aberration, whereas the aspherical surface adopted in the third lens component functions to correct spherical aberration and coma toward the positive side so that the second lens component may produce positive spherical aberration and coma in smaller amounts, and the correcting coefficients of the respective lens elements may have smaller values.

Figure 4:
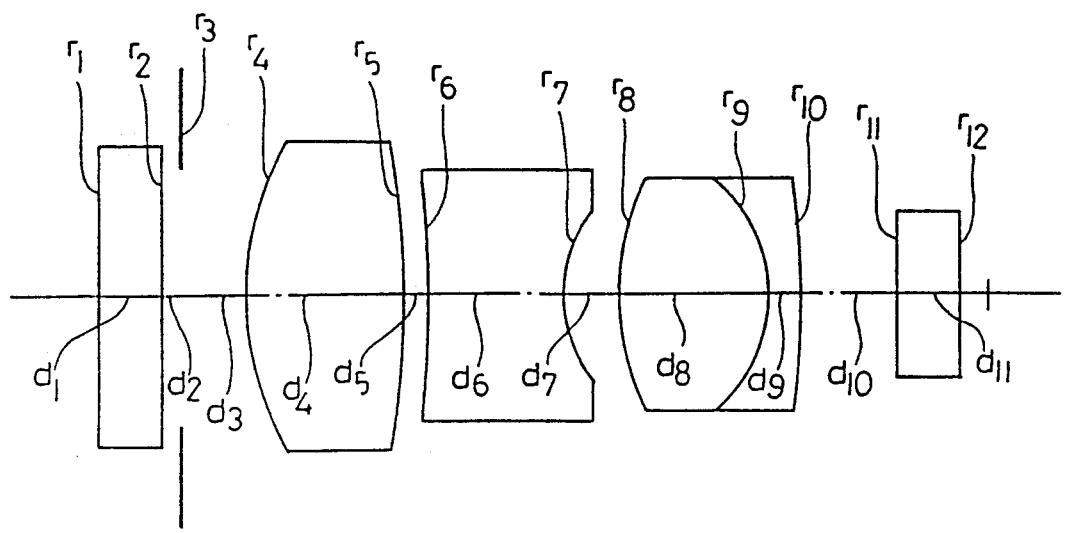

The Embodiment 4 has the composition illustrated in FIG. 4, wherein the first surface ($r_4$) is designed as an aspherical surface, the third lens component is designed as a cemented doublet for correcting coma and the third lens component has strengthened power. Owing to these designs, the first lens component has a weakened power so that the spherical surface of the first lens component located in the vicinity of the optical axis produces spherical aberration in a smaller amount, and the aspherical surface produces positive spherical aberration and coma for correction of these aberrations. In the Embodiment 4, the cemented doublet arranged in the third lens component consists of two lens elements which have a difference $\Delta n$ in refractive index satisfying the following condition:

$$\Delta n > 0.08$$

Figure 5:
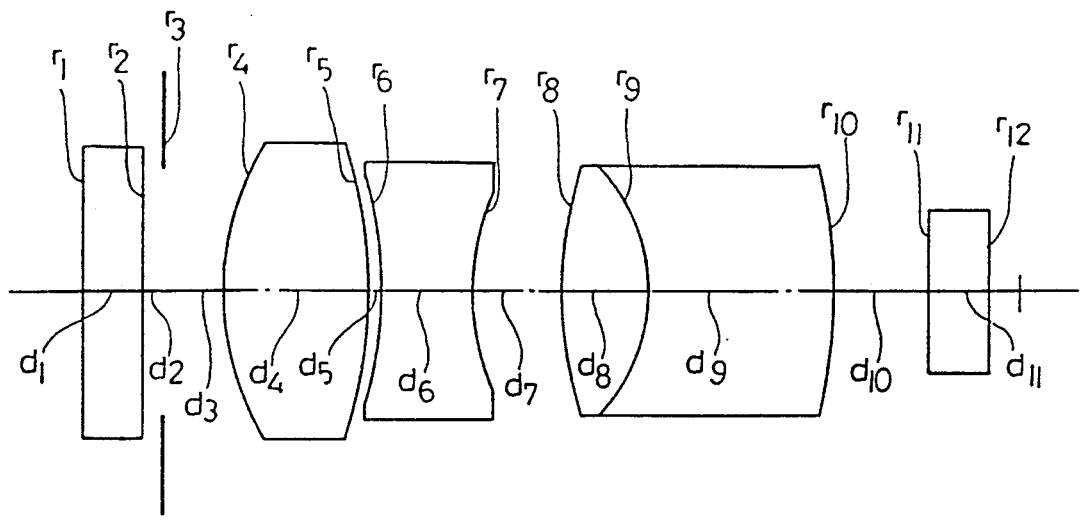

The Embodiment 5 has the composition illustrated in FIG. 5, wherein aspherical surfaces are used as $r_4$ and $r_8$ in the first lens component and the third lens component respectively, and the third lens component is designed as a cemented doublet.

In the Embodiment 5, each of the lens components is designed so as to have rather a long focal length for correcting especially coma. Especially, the paraxial curved surface of the aspherical surface arranged in the third lens component is designed so as to produce coma in a smaller amount, and the aspherical surface arranged in the third lens component functions to correct spherical aberration and coma more favorably. Further, in order to suppress the influence on astigmatism, the aspherical surface is arranged on the eye side in the third lens component.

Figure 6:
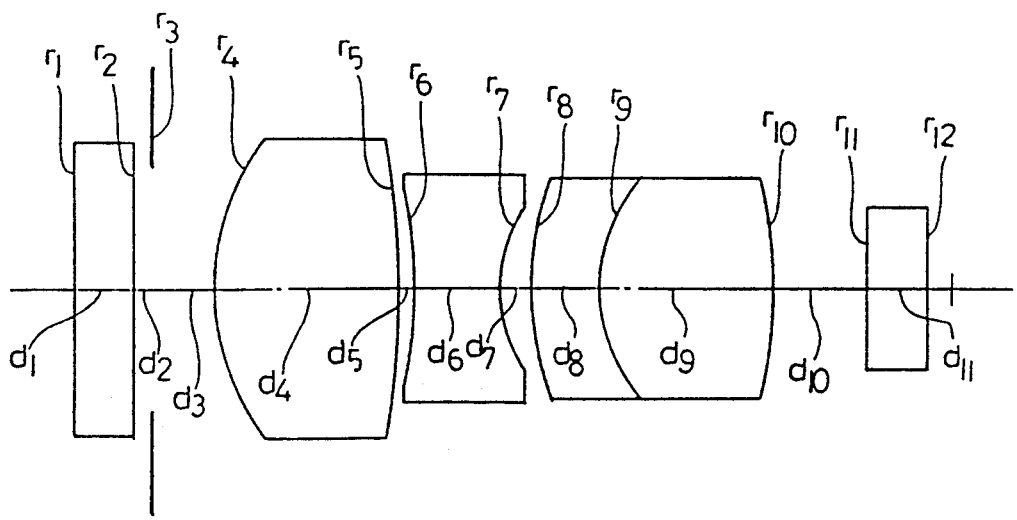
Figure 7:
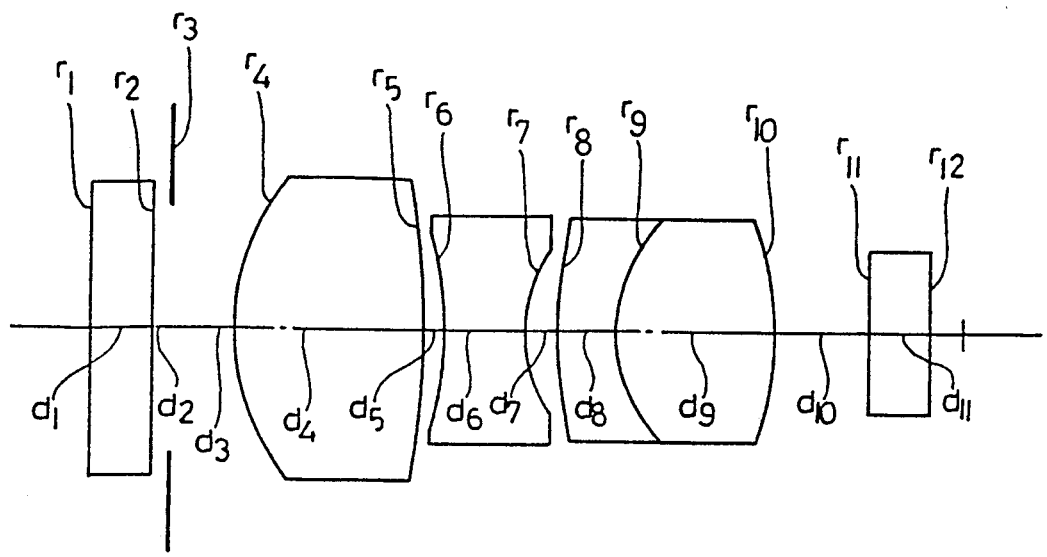

The Embodiments 6 and 7 have the compositions illustrated in FIG. 6 and FIG. 7 respectively, in each of which aspherical surfaces are used as $r_4$ and $r_8$ in the first lens component and the third lens component respectively so that the aspherical surface arranged in the third lens component corrects coma and spherical aberration within such a range as not to give influence on astigmatism. Further, difference $\Delta n$ in refractive index between the two lens elements composing the cemented doublet is $0.3214 > 0.08$ in the Embodiment 6 and $0.2555 > 0.08$ in the Embodiment 7.

Each of the Embodiments 1 through 7 described above consists of the first positive lens component, the second negative lens component and the third positive lens component, and uses an aspherical surface satisfying the conditions (1) and (2).

Figure 8:
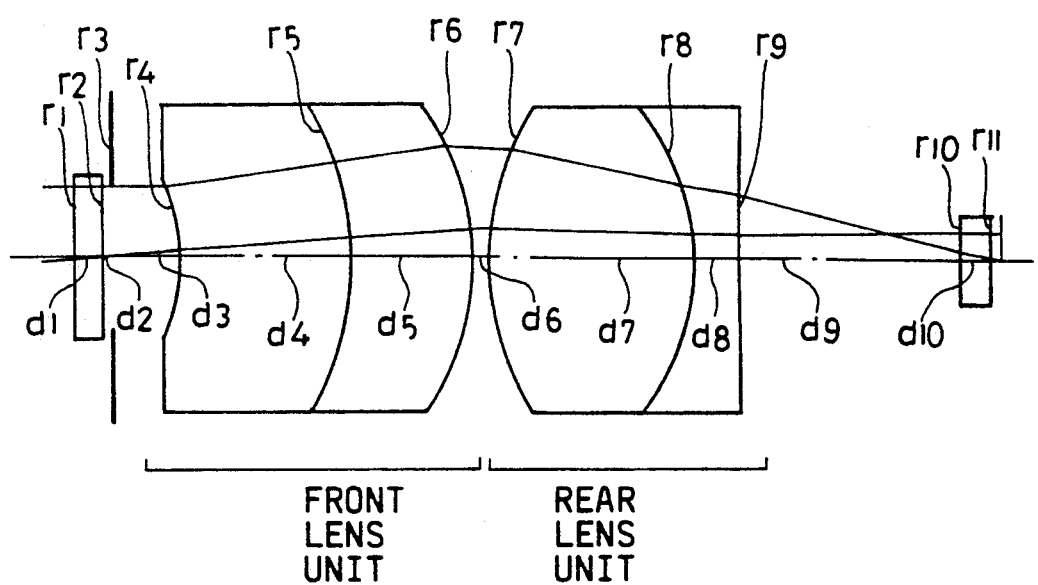
Figure 9:
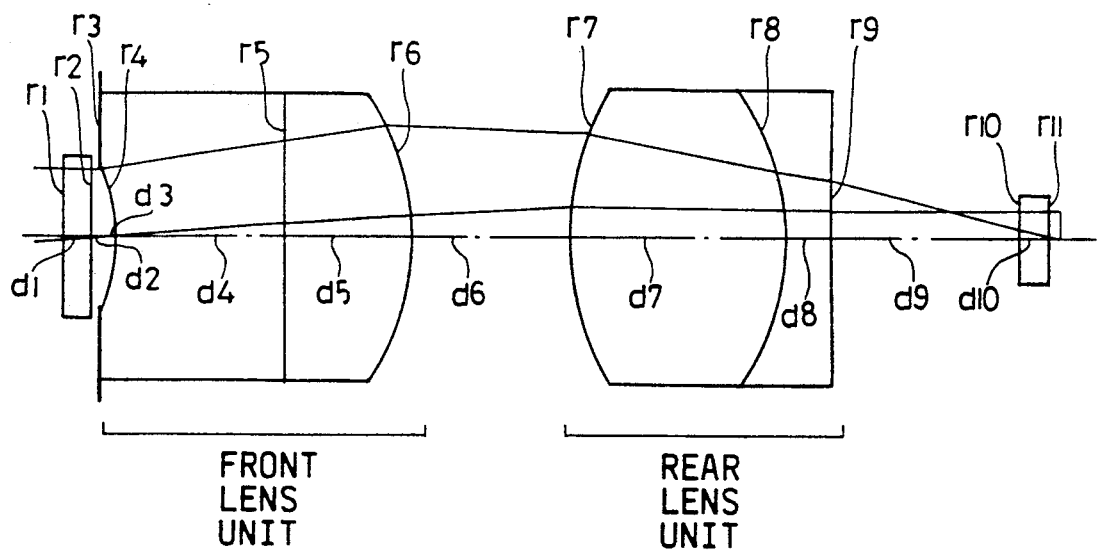

The Embodiments 8 and 9 have the compositions illustrated in FIG. 8 and FIG. 9 respectively, in each of which the eyepiece lens system for endoscopes is composed of four lens elements and adopts cemented doublets for permitting simplifying structure of the lens barrel. Especially in the Embodiment 9, the front lens unit adopts a planar cemented surface and an aspherical lens element which is designed as a plano-convex lens element. When an aspherical lens element is shaped by pressing, for example, eccentricity of the lens element is caused by misalignment between the dies used for forming both the surfaces of the lens element. However, such eccentricity is ignorable for the plano-convex lens element used in the Embodiment 9.

Figure 10:
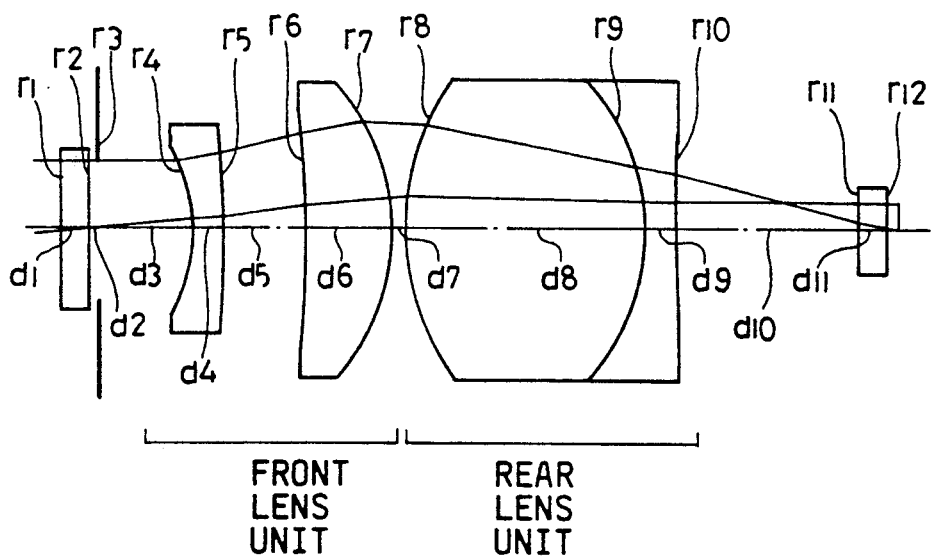
Figure 11:
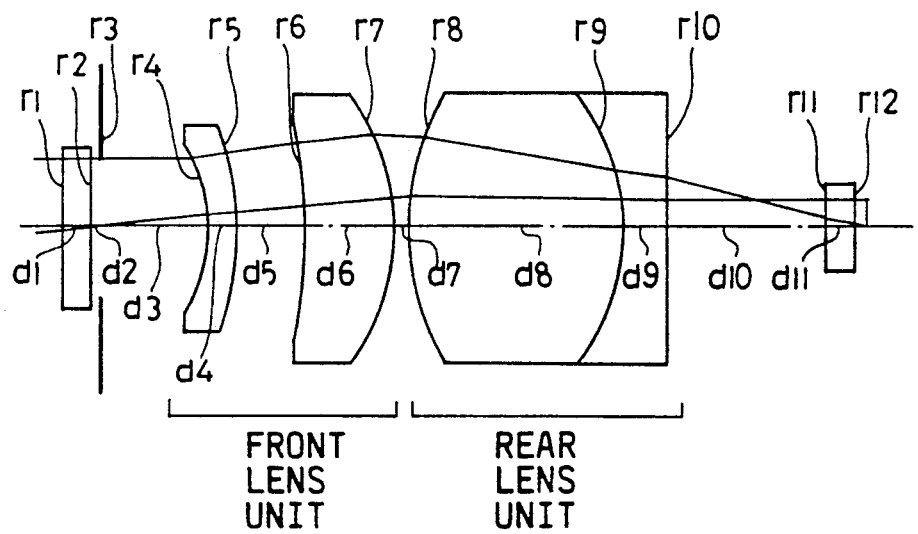
Figure 12:
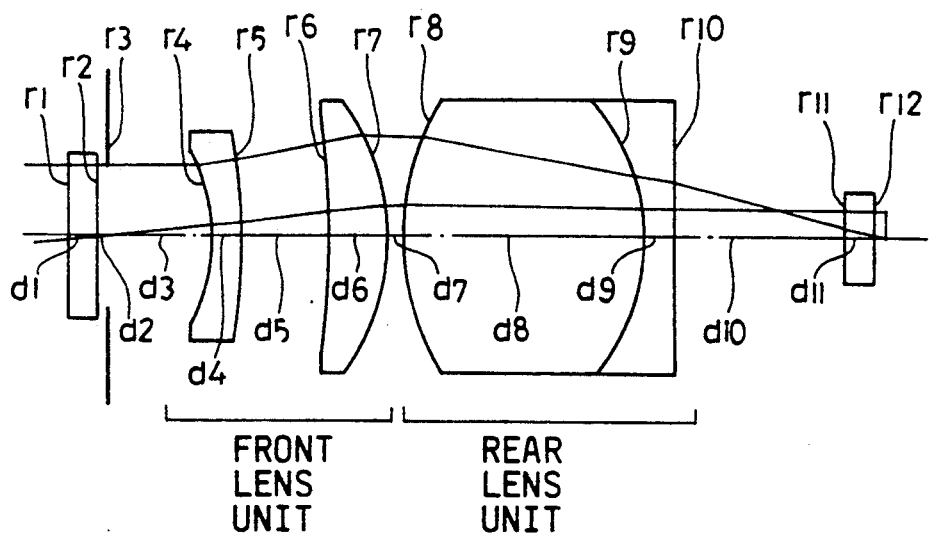

The Embodiments 10 through 12 have the compositions illustrated in FIG. 10 through FIG. 12 respectively, in each of which the front lens unit is composed, in the order from the eye side, of a negative lens component and a positive lens component.

Figure 13:
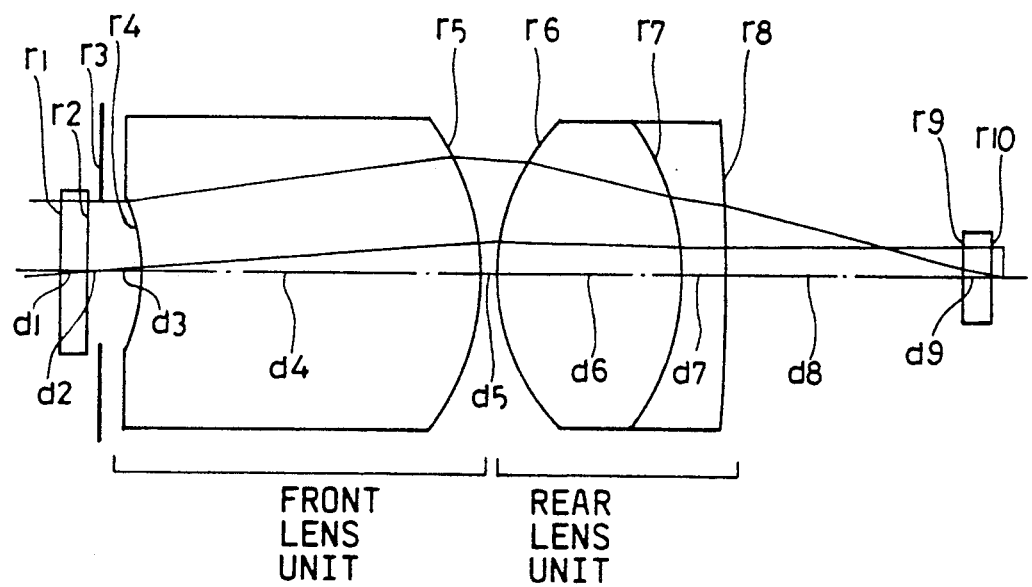

The Embodiment 13 has the composition illustrated in FIG. 13, wherein the front lens unit is composed of a single lens element so that the eyepiece lens system for endoscopes as a whole consists of three lens elements in total.

Figure 14:
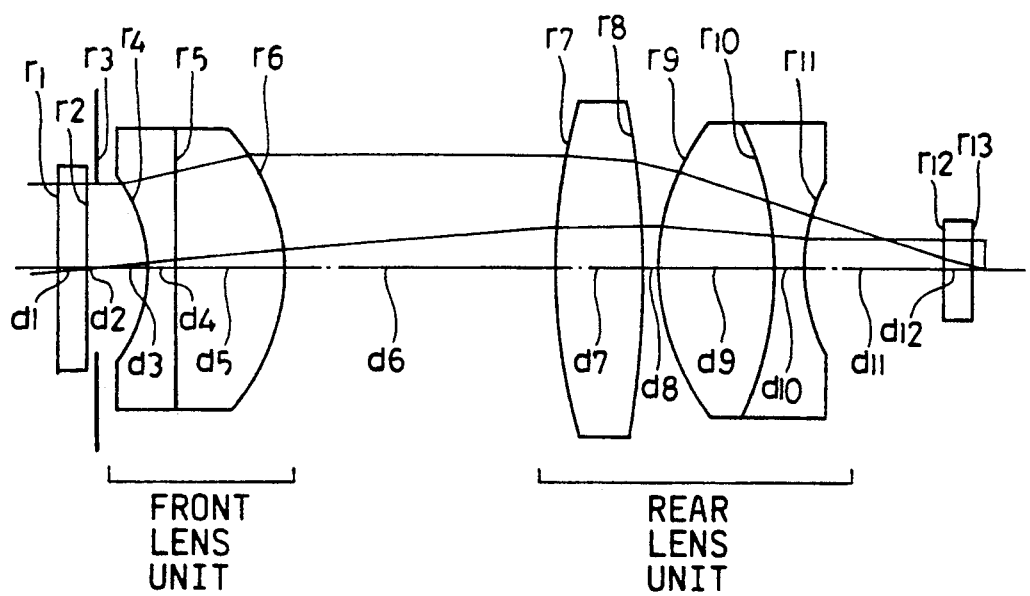
Figure 15:
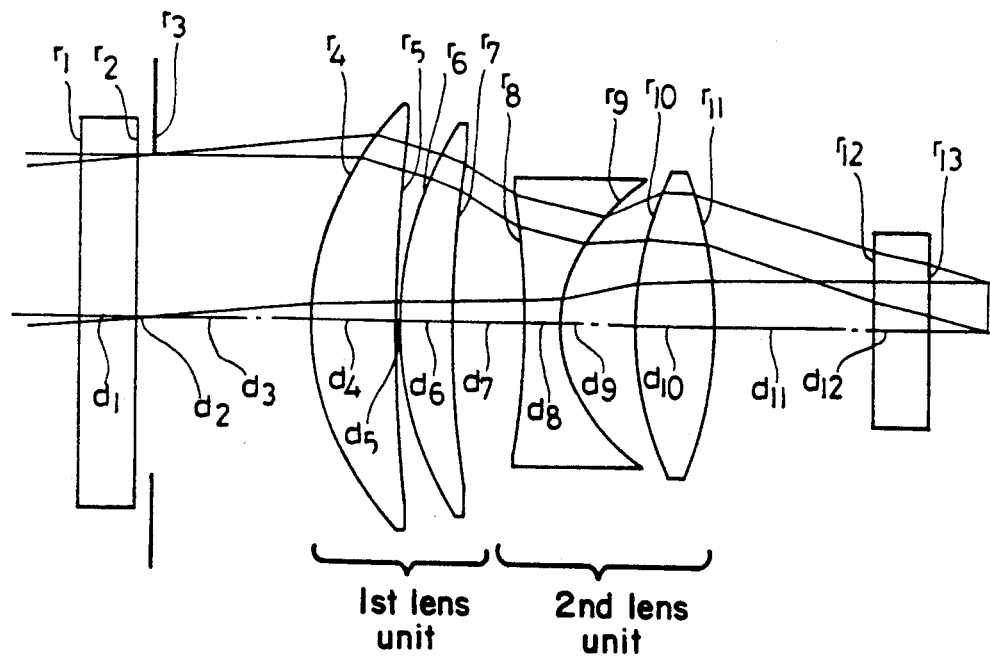
Figure 16:
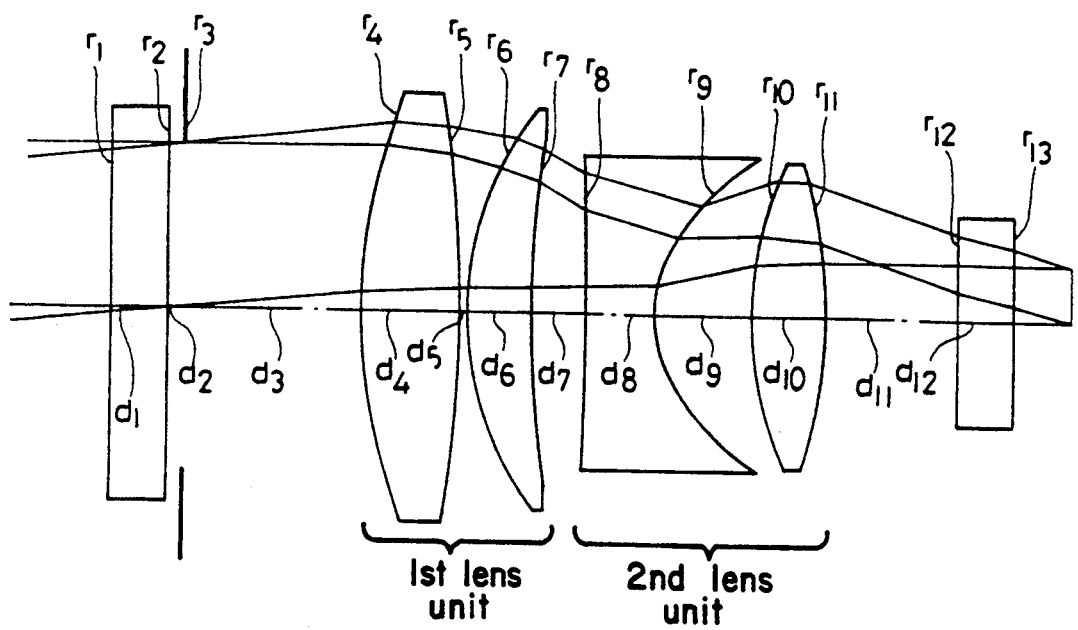
Figure 17:
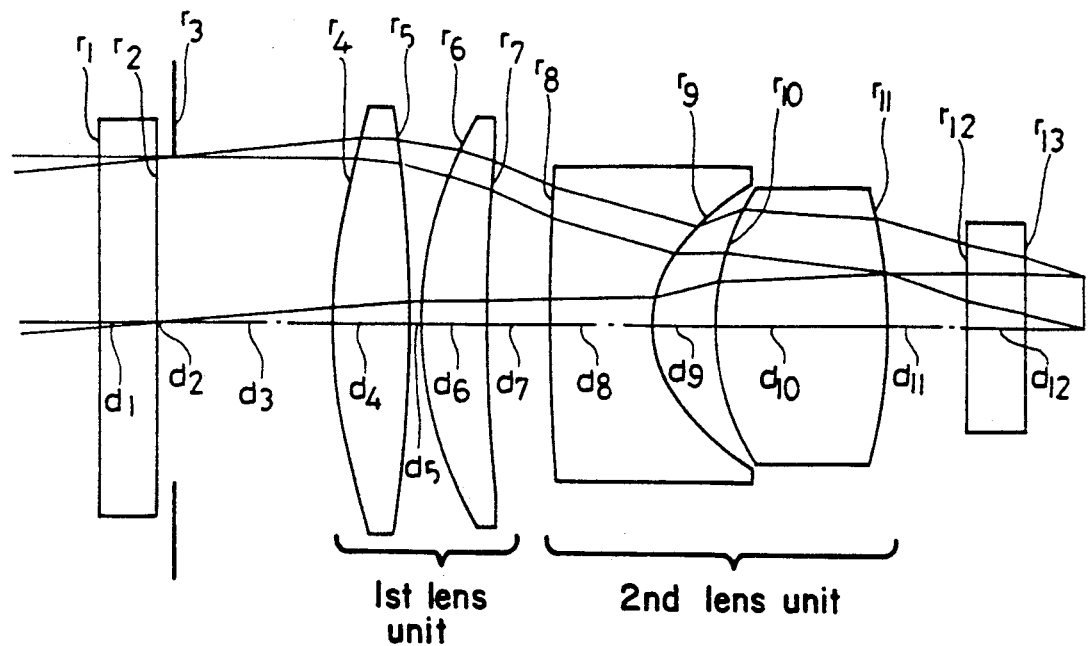

The Embodiment 14 has the composition illustrated in FIG. 14, wherein the rear lens unit is composed of a positive lens component and a cemented doublet, and the eyepiece lens system for endoscopes consists of five lens elements in total. The Embodiment 14 has a numerical aperture which is larger than those of the Embodiments 8 through 13.

Each of the Embodiments 8 through 14 described above consists of a front lens unit which has an eye side surface concave toward the eye side and an object side surface convex toward the object side, and a rear lens unit which comprises a cemented doublet and has a positive refractive power as a whole, and uses aspherical surfaces arranged therein.

The Embodiments 15 through 19 have the compositions illustrated in FIG. 15 through FIG. 19 respectively and are designed on the basis of the Ernostar type. In each of these embodiments, the object side surface of the negative lens component is designed as an aspherical surface and both the surfaces of this negative lens component are designed so as to have refracting angles which are nearly equal to each other for minimizing the influence due to eccentricity to be caused at the shaping stage. Further in order to reduce Petzval's sum, radius of curvature $R_n$ of these surfaces is shortened and selected within a range satisfying the following condition (16):

$$0.05f < R_n < 1.2f \tag{16}$$

wherein $1/R_n = C + 2B$

If the upper limit of the condition (16) is exceeded, the image surface will be inclined toward the negative side, thereby degrading the imaging performance for the offaxial ray of the eyepiece lens system for endoscopes. If the lower limit of the condition (16) is exceeded, in contrast, the aspherical surface will have a shape which can hardly be formed in practice.

Furthermore, in the embodiments 15 and 16, the coefficient E of the concave aspherical surface has a positive value $E_n$ which is within the range defined by the following condition (17):

$$(N-N')\cdot E_n < 0 \qquad (17)$$

Spherical aberration of the third order is corrected by designing the concave aspherical surface so as to satisfy the condition (17) mentioned above. The Embodiments 15 and 16 use aspherical surfaces which have portions progressively strengthening the diverging power for the rays as said portions are farther from the optical axis.

In the Embodiment 17, the above-mentioned coefficient E has a value $E_n'$ which satisfies the following condition (17'):

$$(N-N')\cdot E_n' < 0 \qquad (17')$$

In the Embodiment 17, curvature on the eye side surface of the fourth positive lens element is higher than that on the object side surface of said lens element for correcting spherical aberration.

Figure 18:
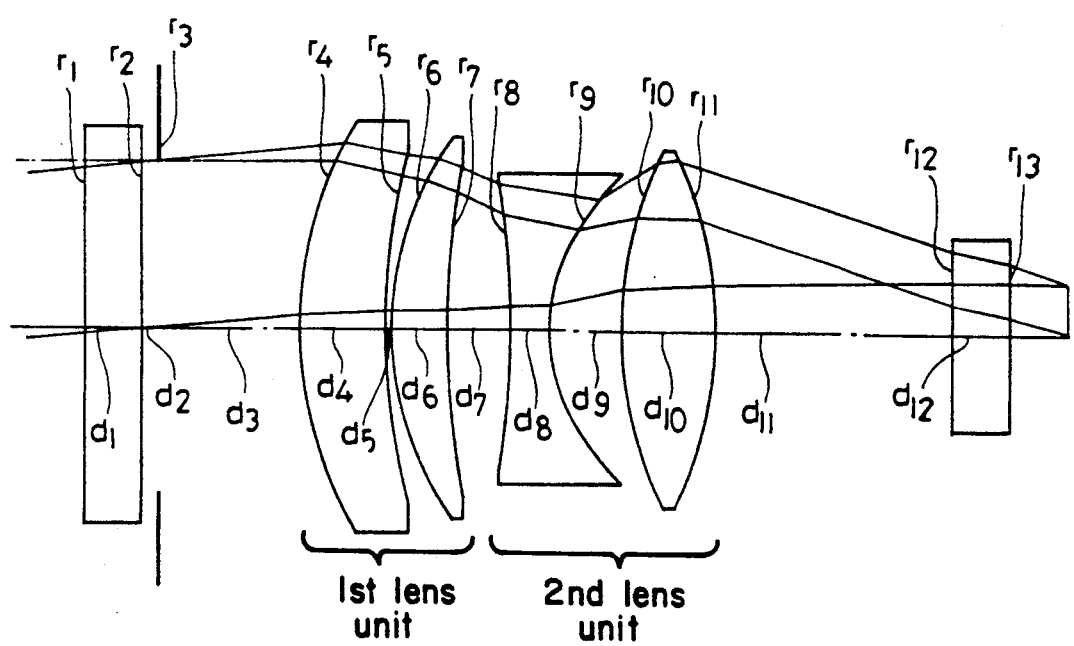

In the Embodiment 18 having the composition illustrated in FIG. 18, the fourth positive lens element has a convex aspherical surface which has portions progressively weakening the converging power for the rays as said portions are farther from the optical axis.

Figure 19:
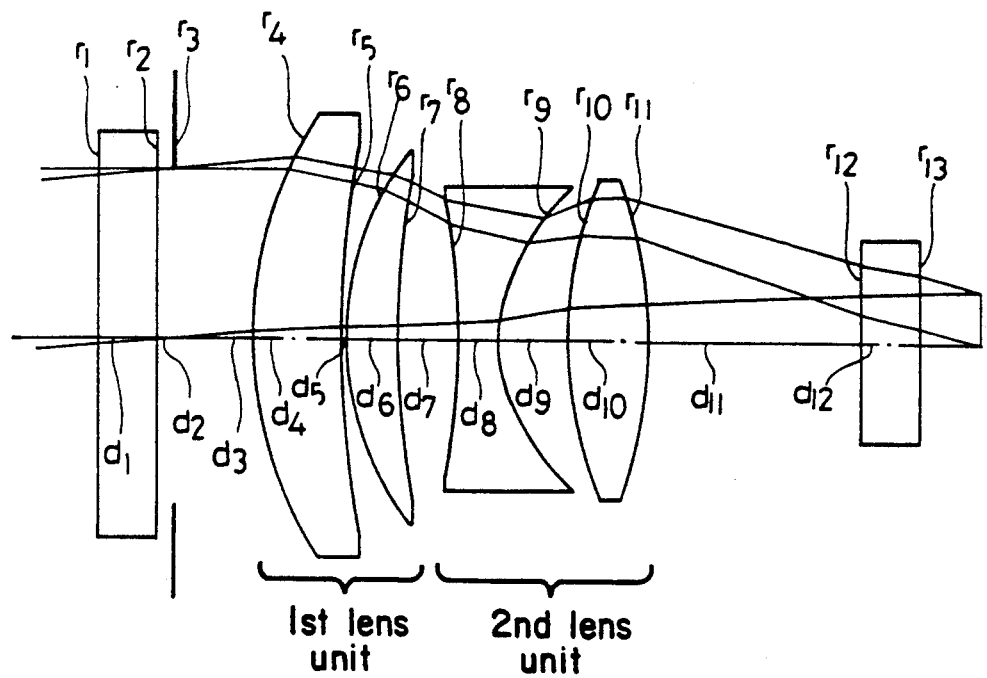
Figure 20:
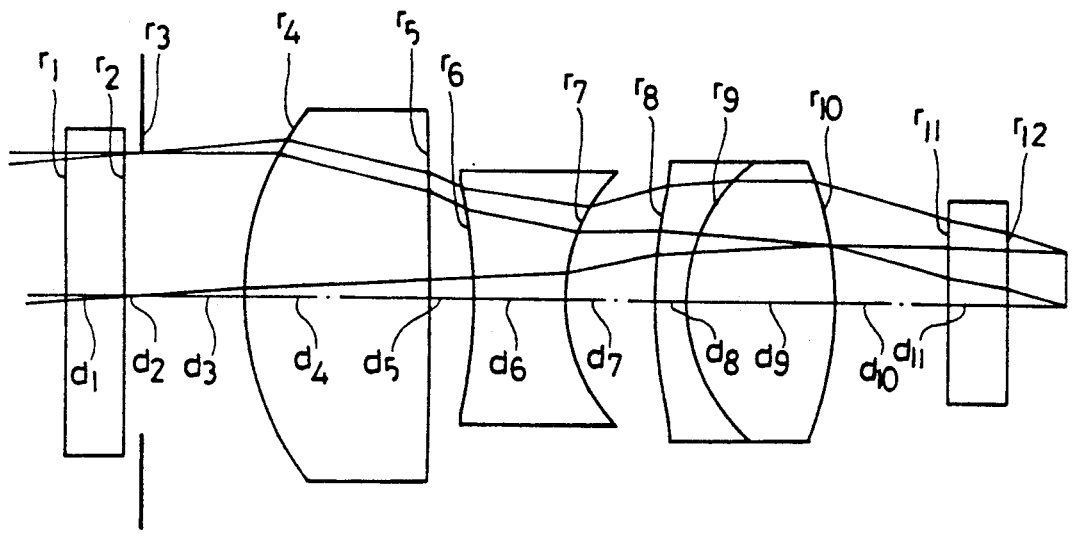
Figure 21:
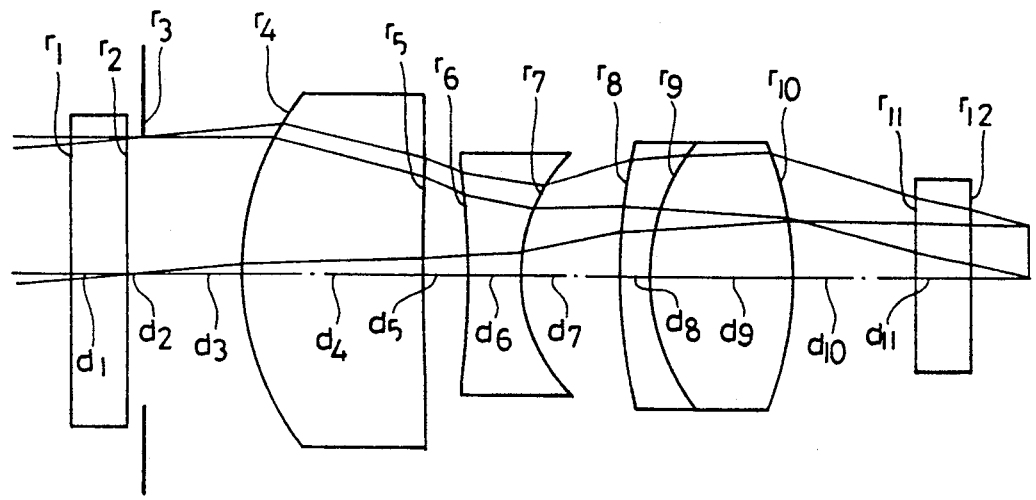
Figure 22:
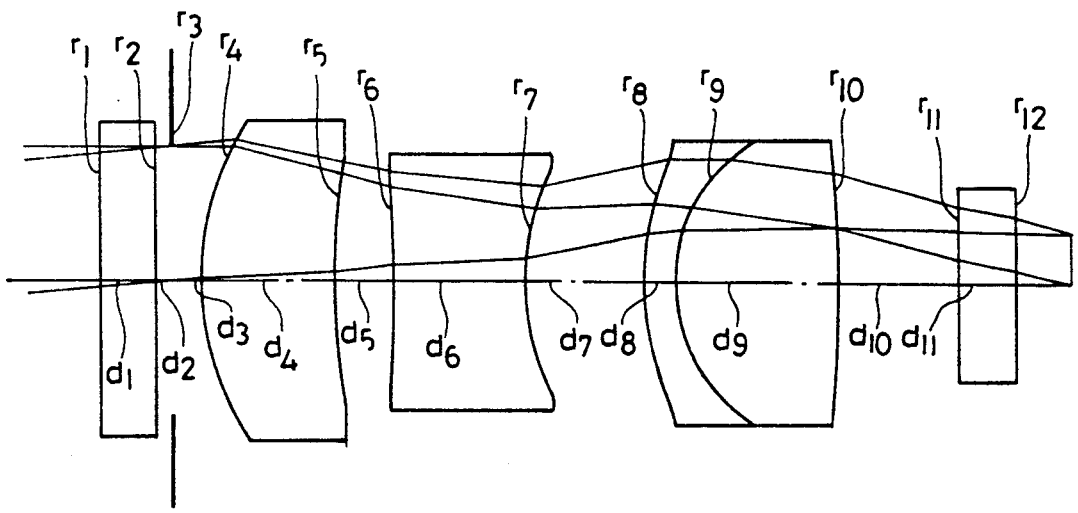
Figure 23:
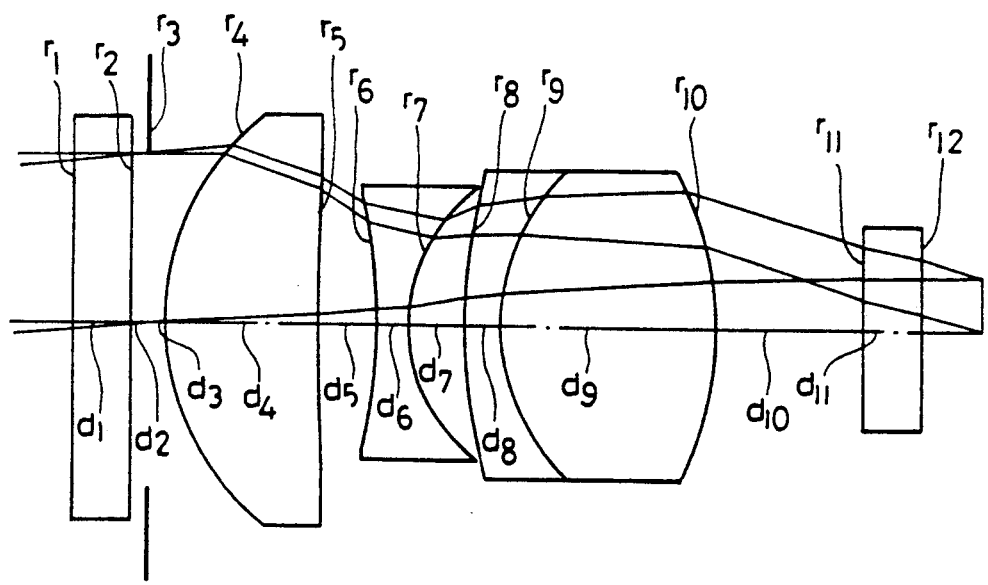
Figure 24:
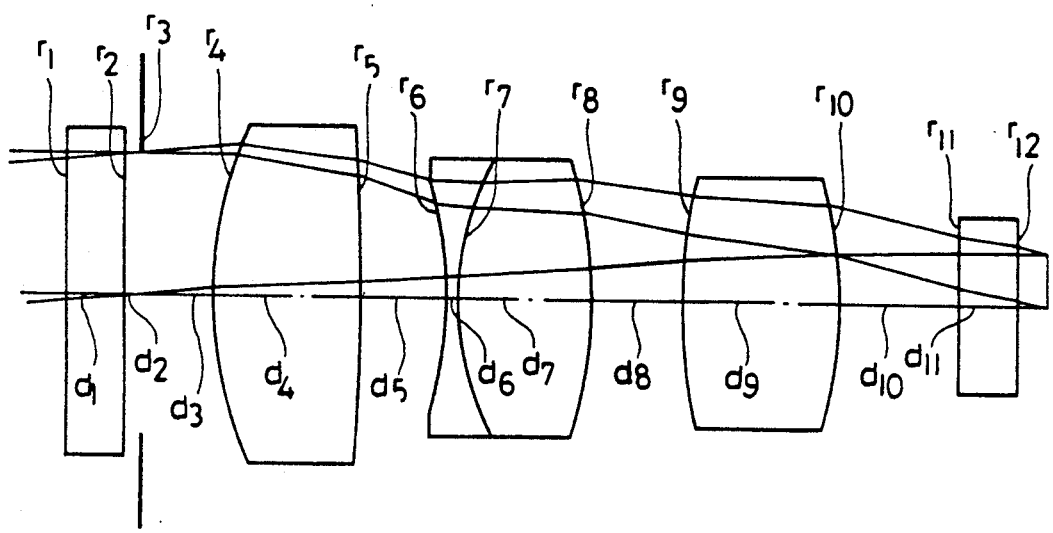
Figure 25:
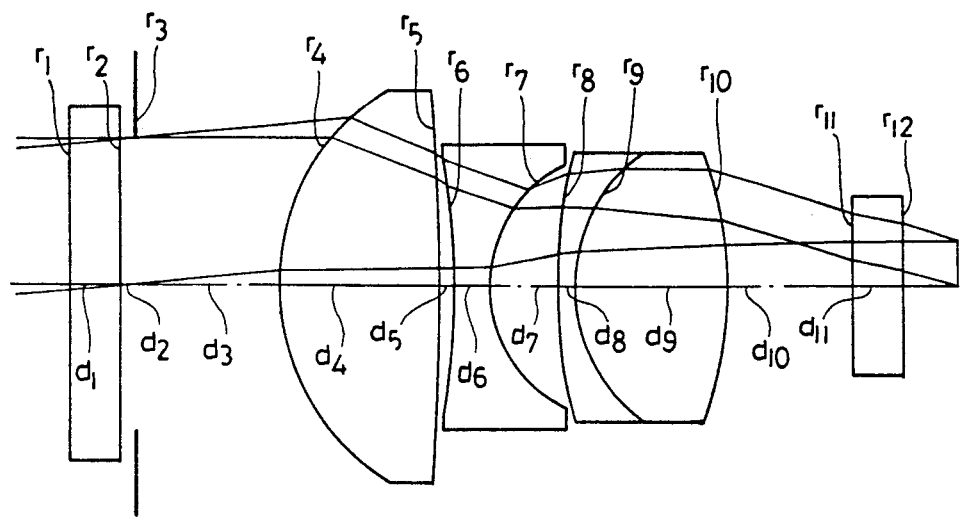
Figure 26:
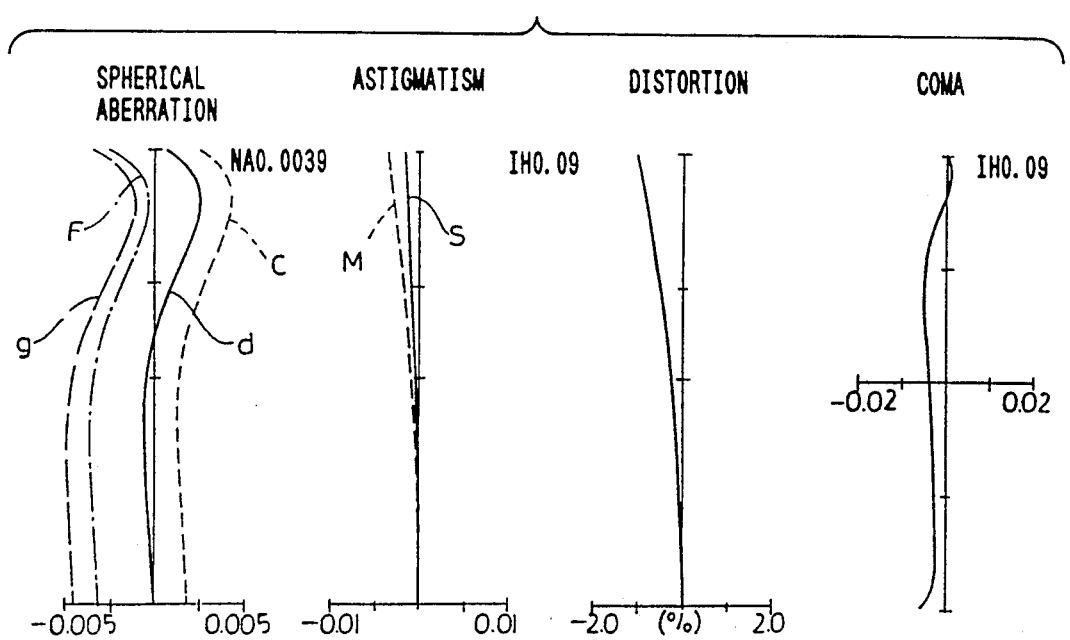
Figure 27:
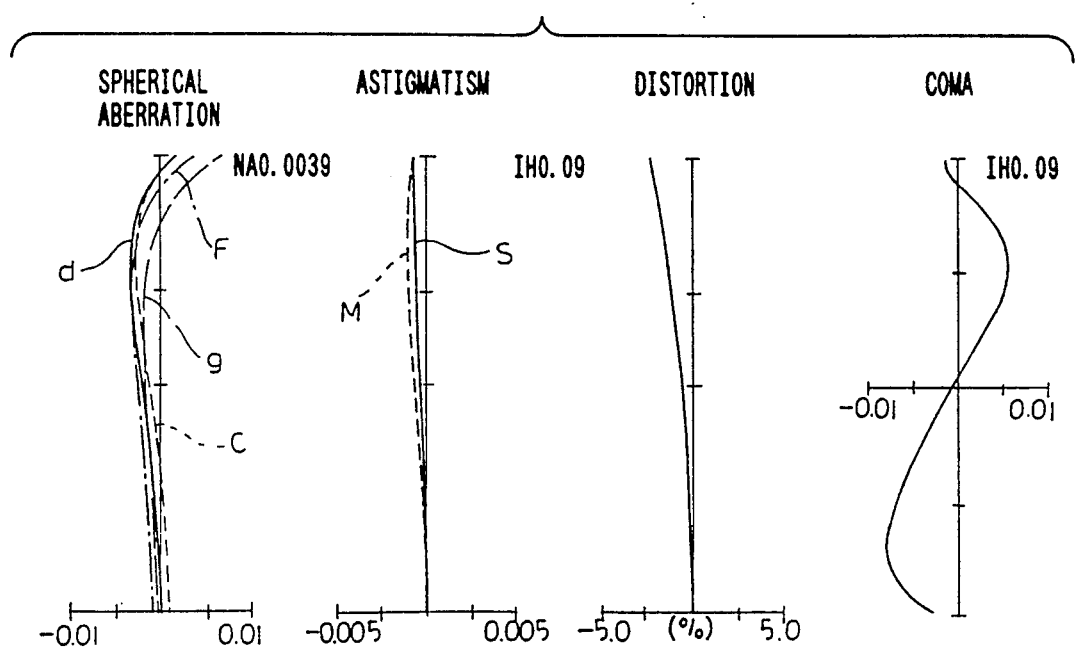
Figure 28:
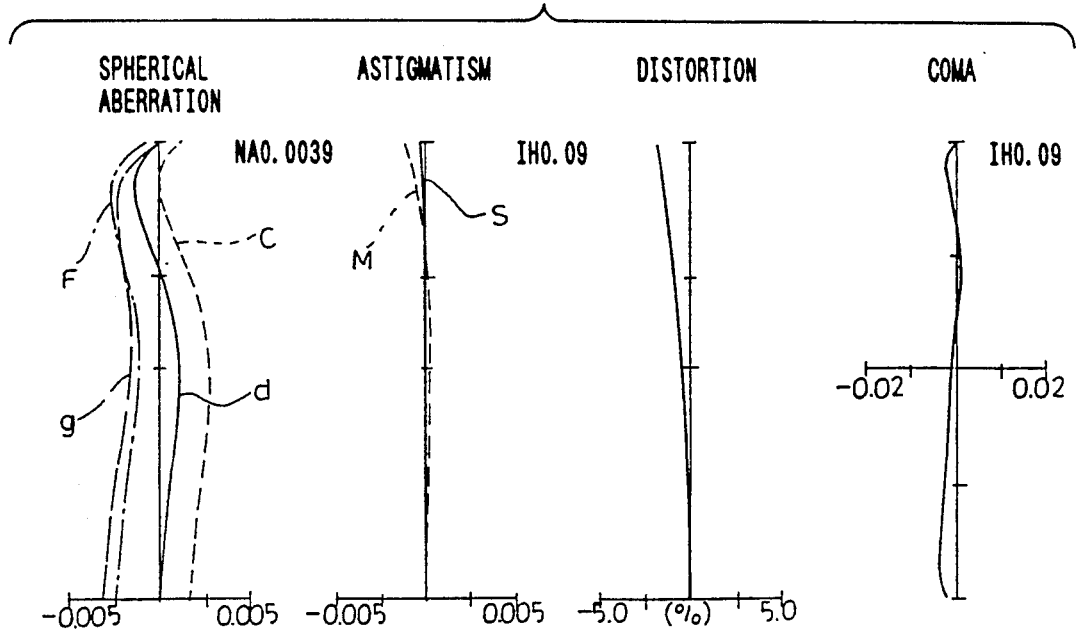
Figure 29:
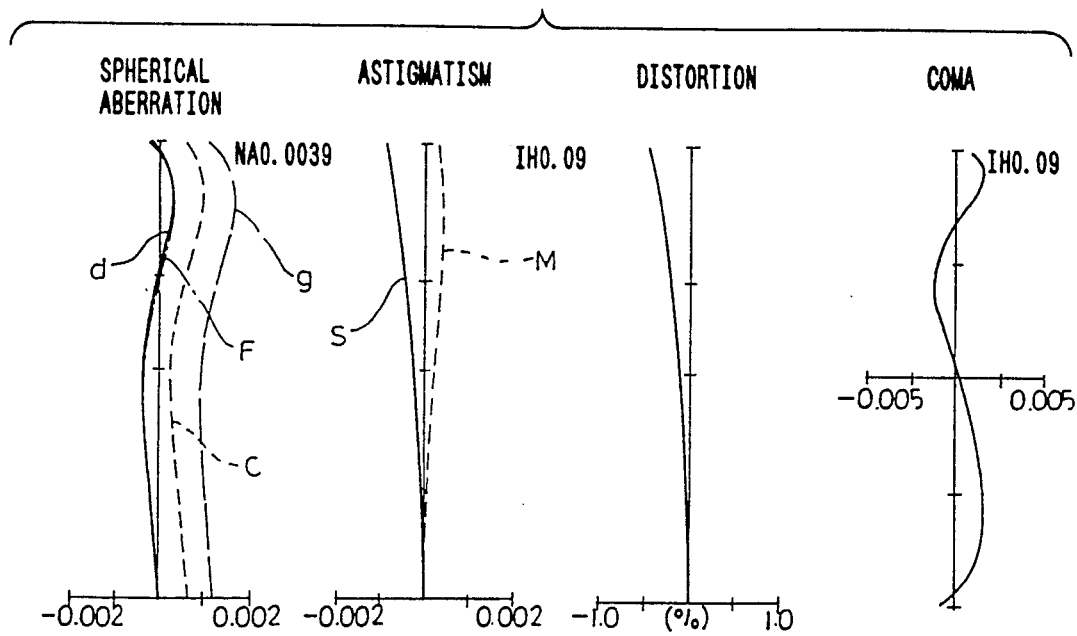
Figure 30:
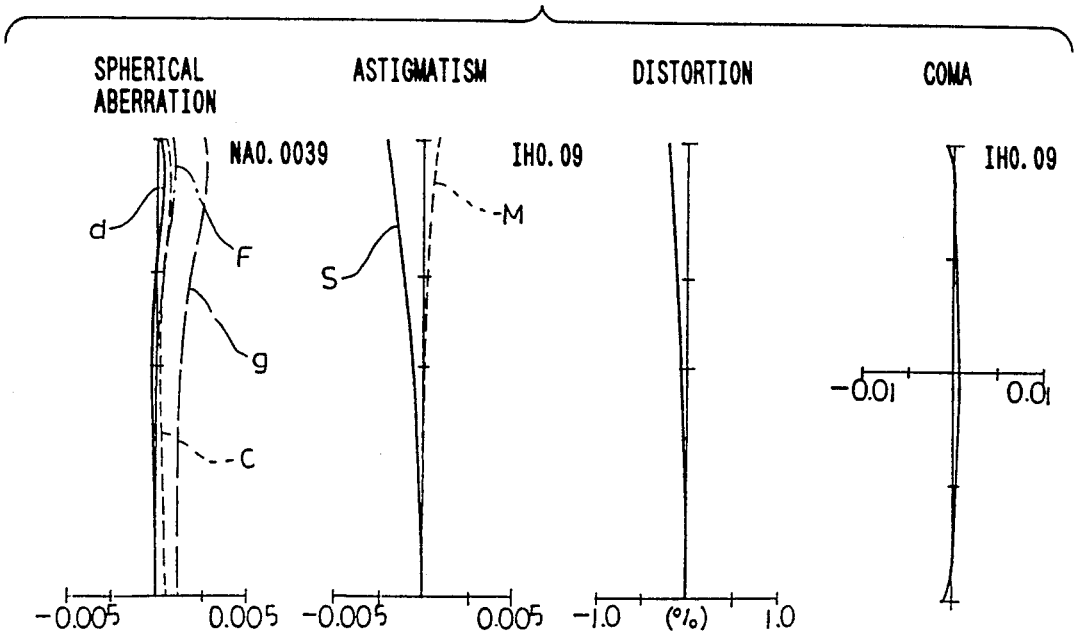
Figure 31:
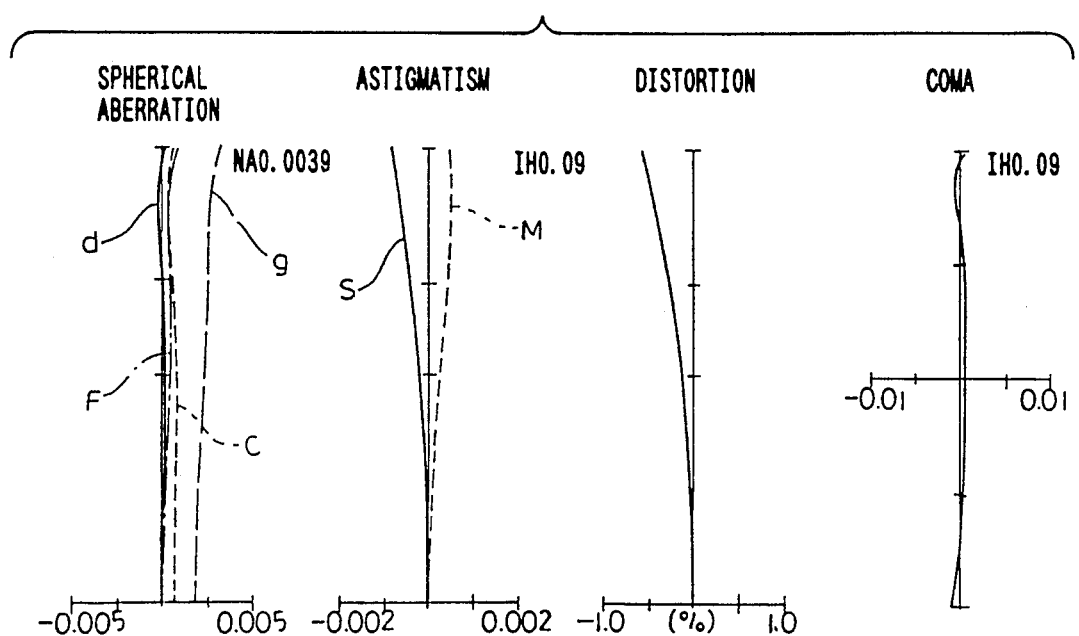
Figure 32:
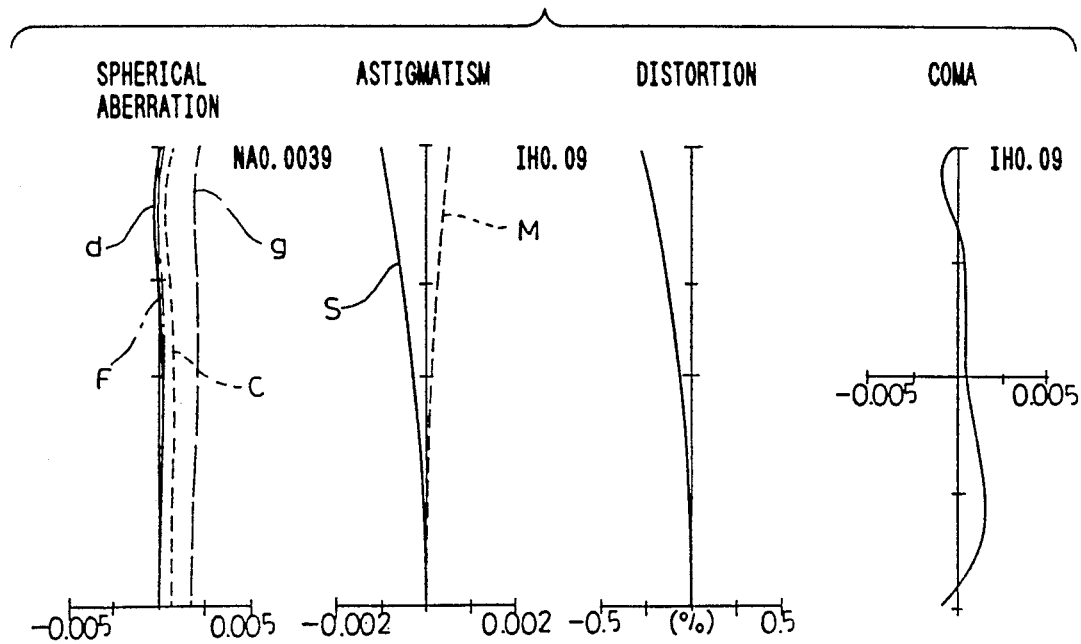
Figure 33:
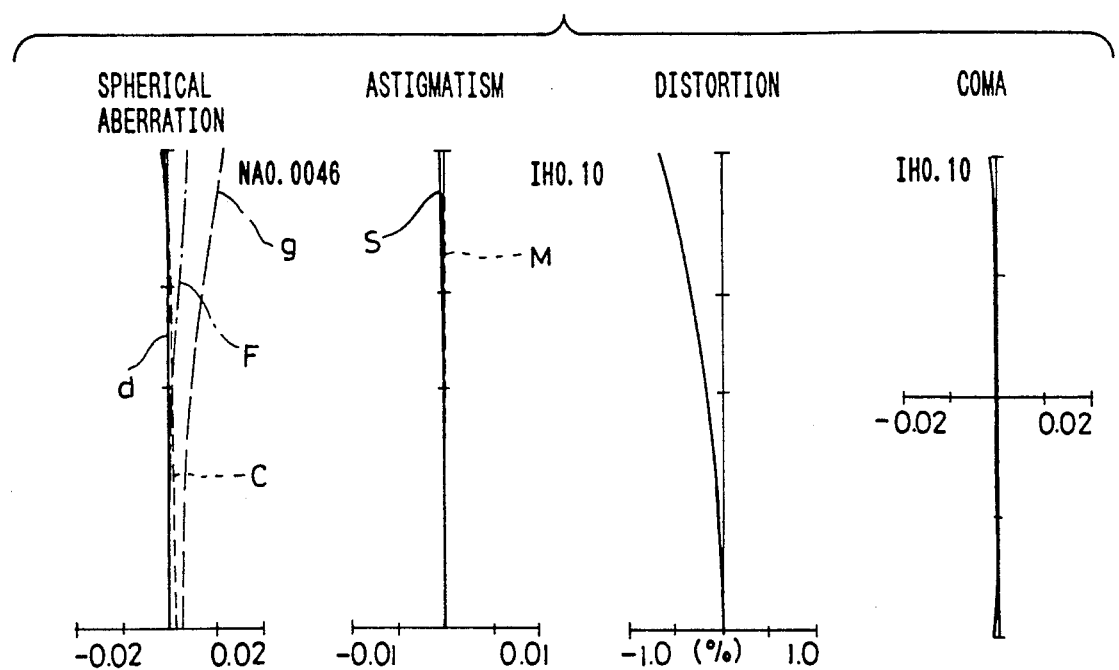
Figure 34:
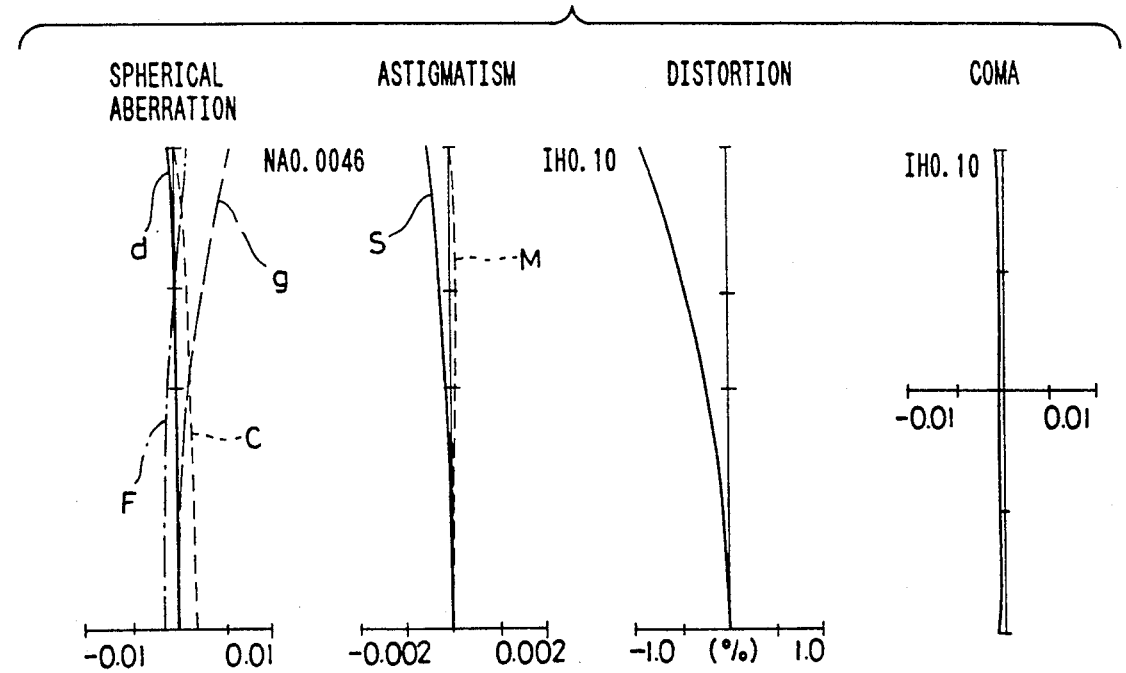
Figure 35:
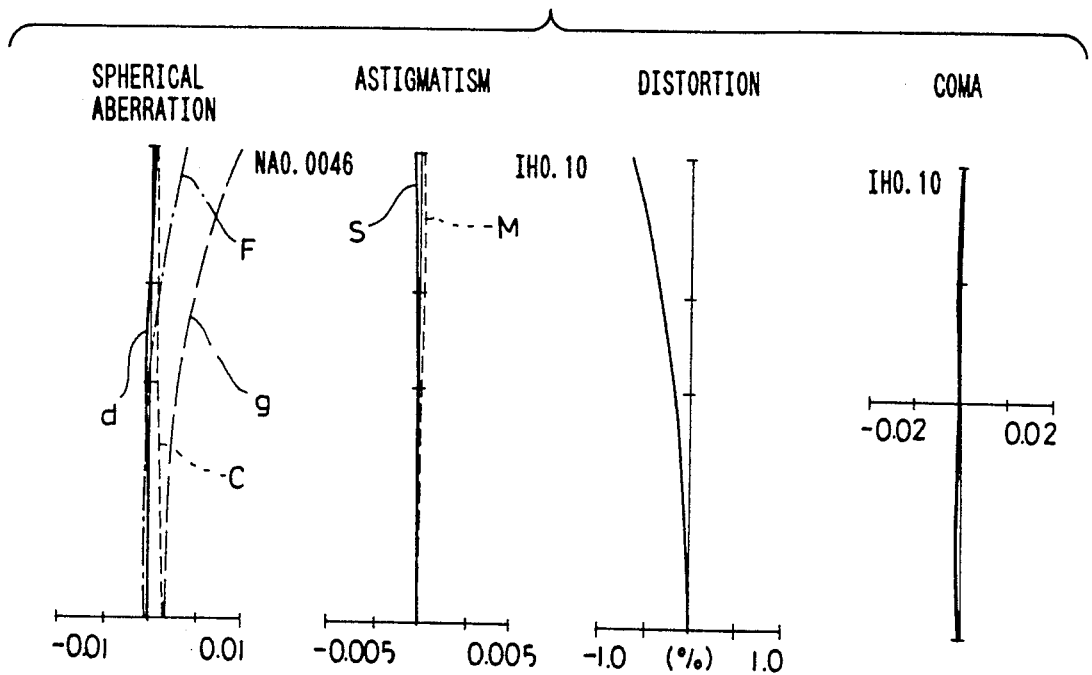
Figure 36:
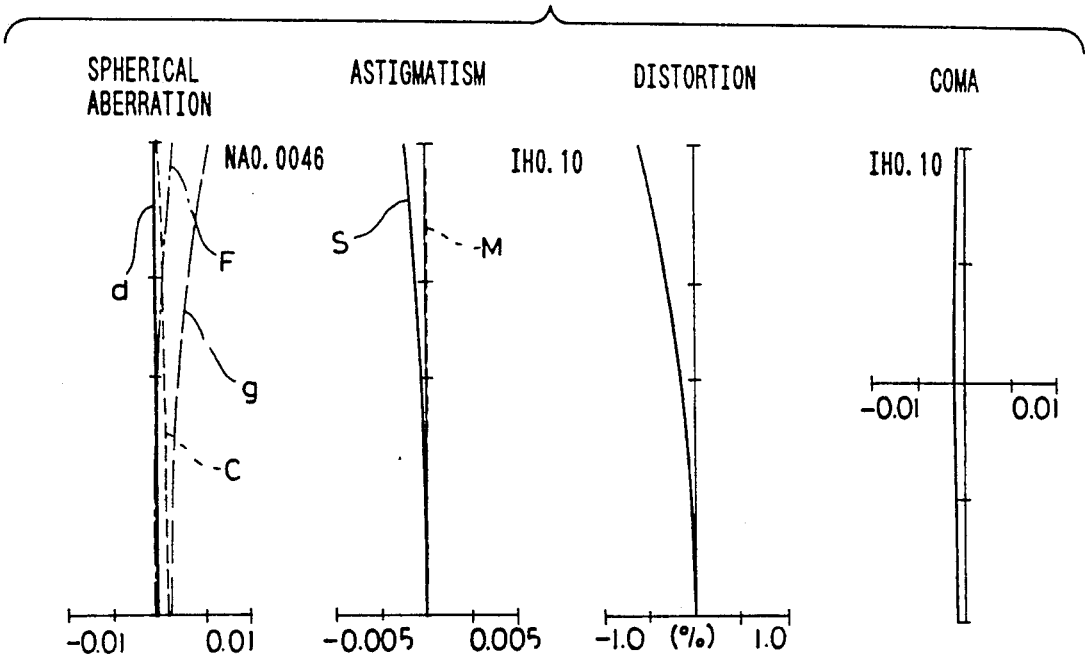
Figure 37:
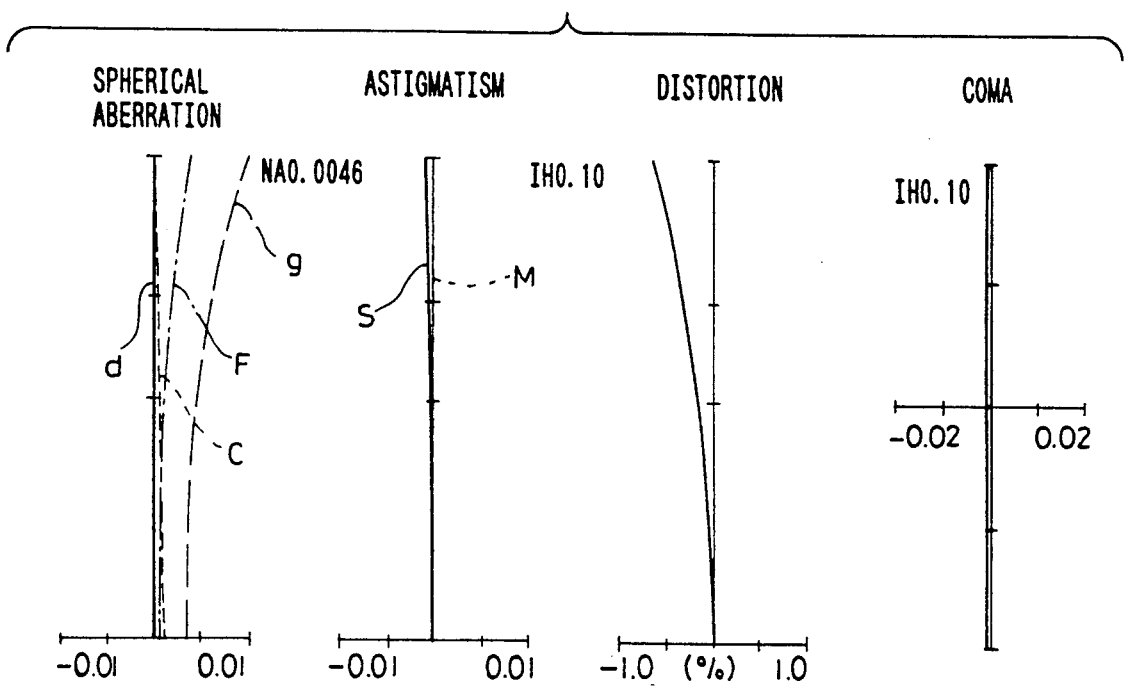
Figure 38:
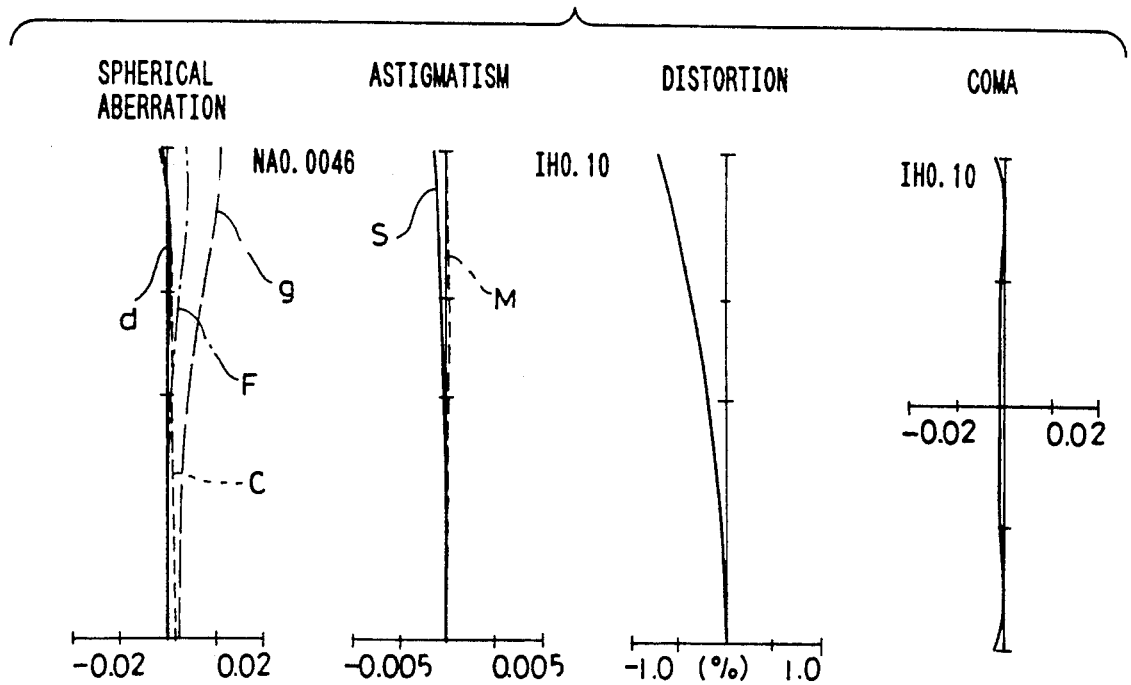
Figure 39:
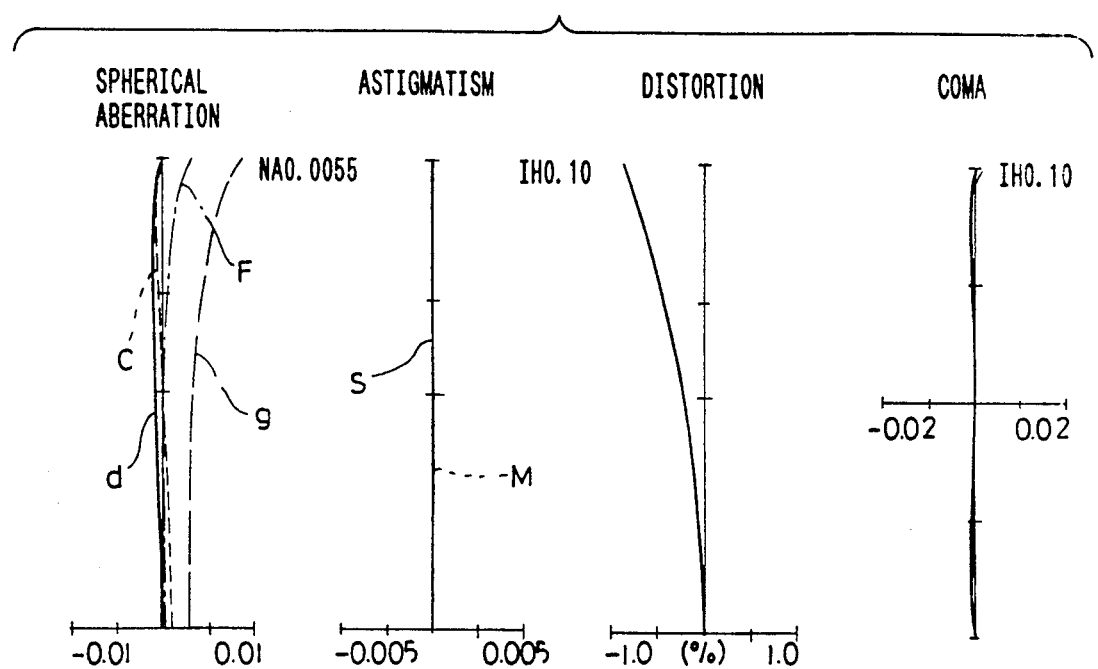
Figure 40:
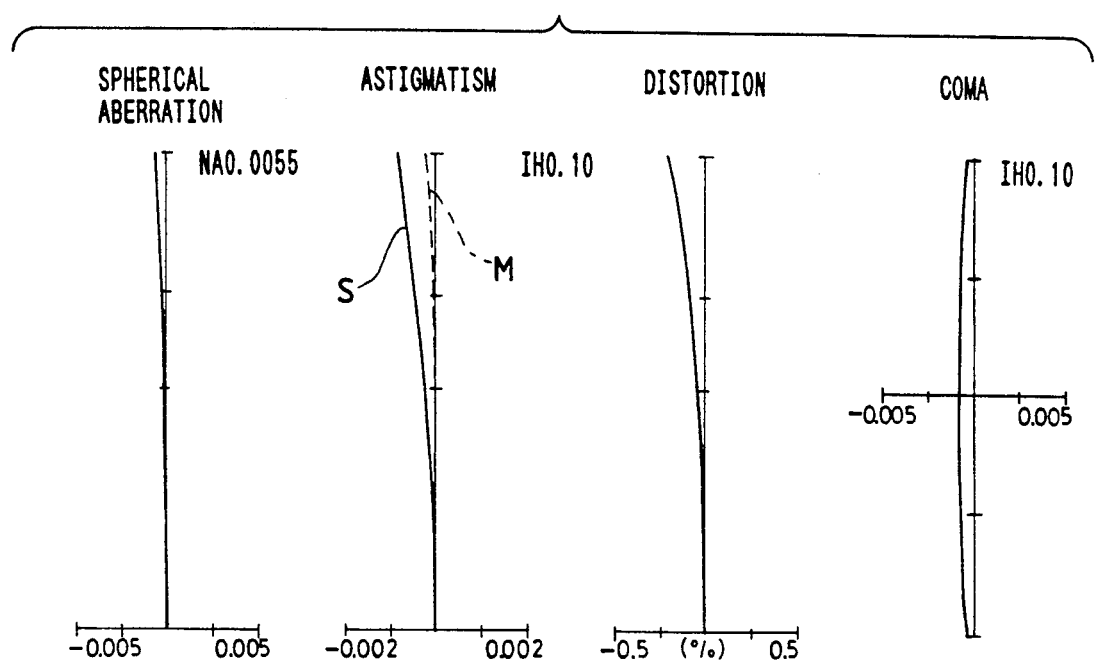
Figure 41:
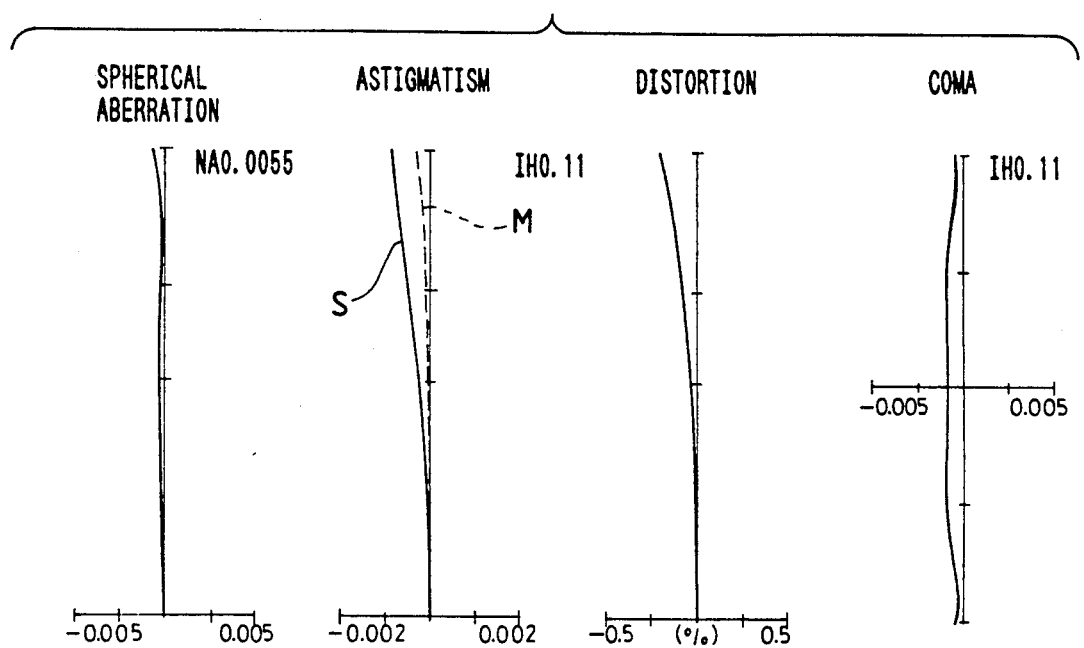
Figure 42:
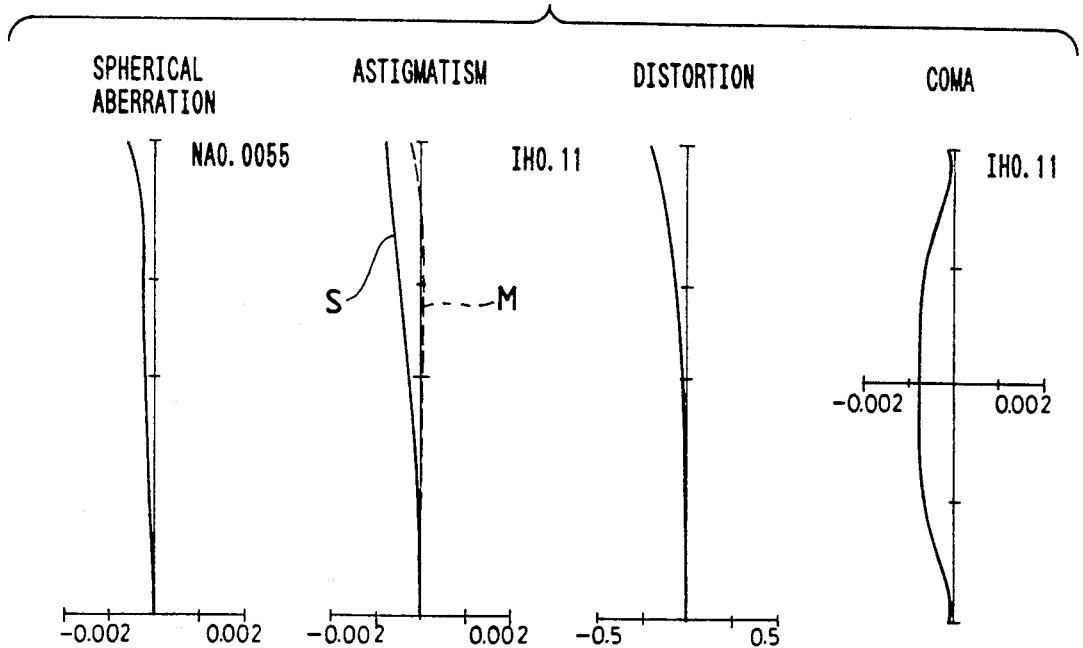
Figure 43:
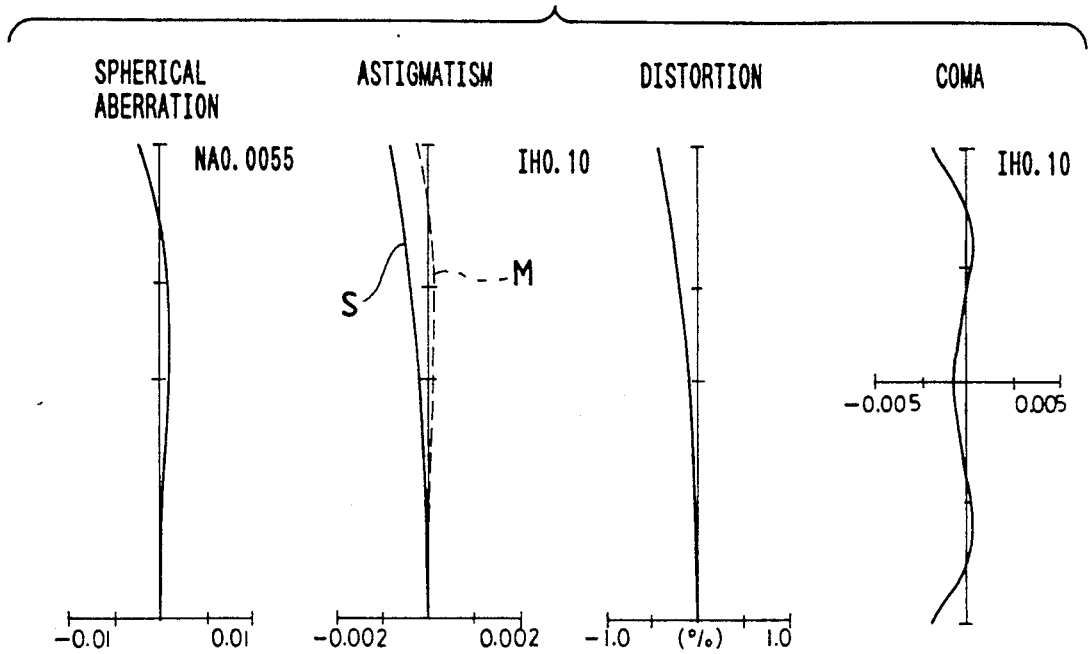
Figure 44:
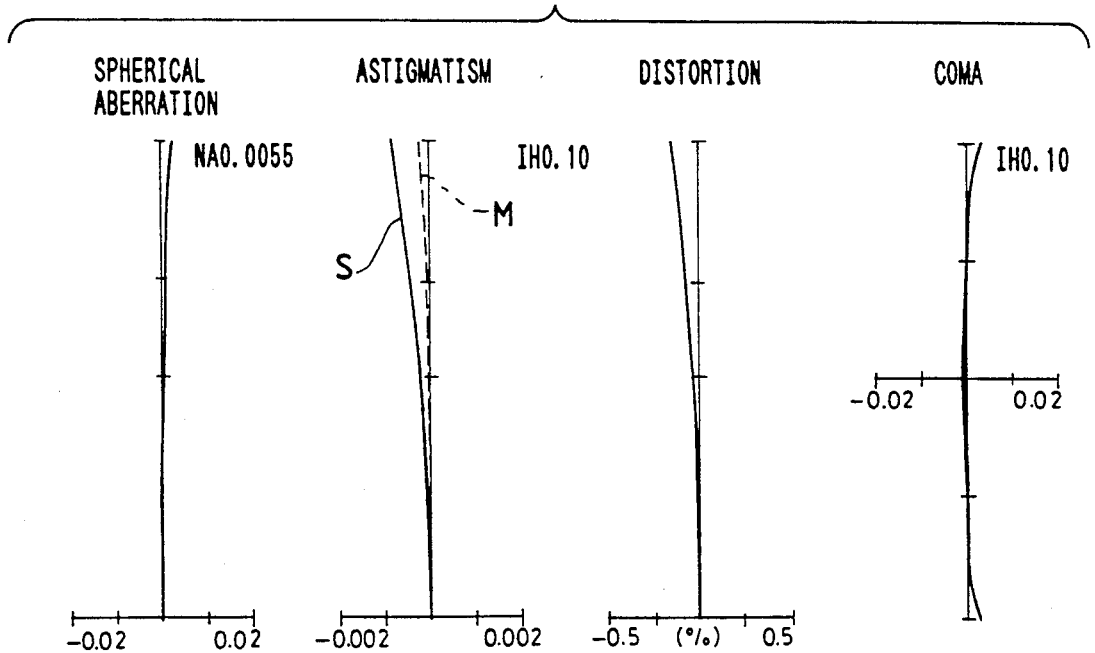
Figure 45:
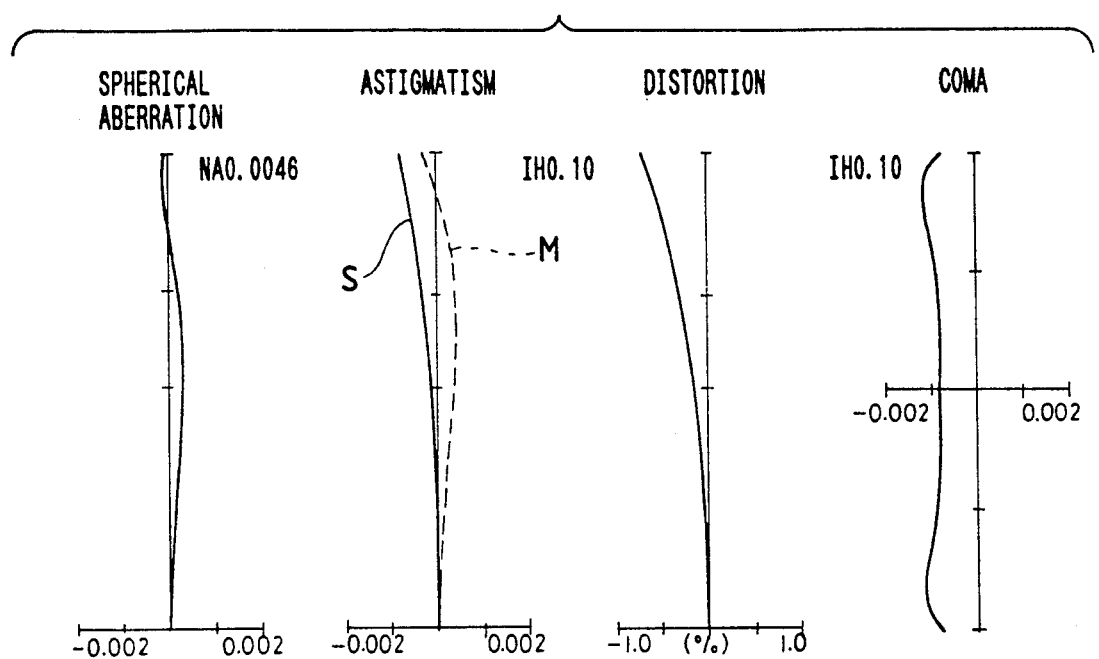
Figure 46:
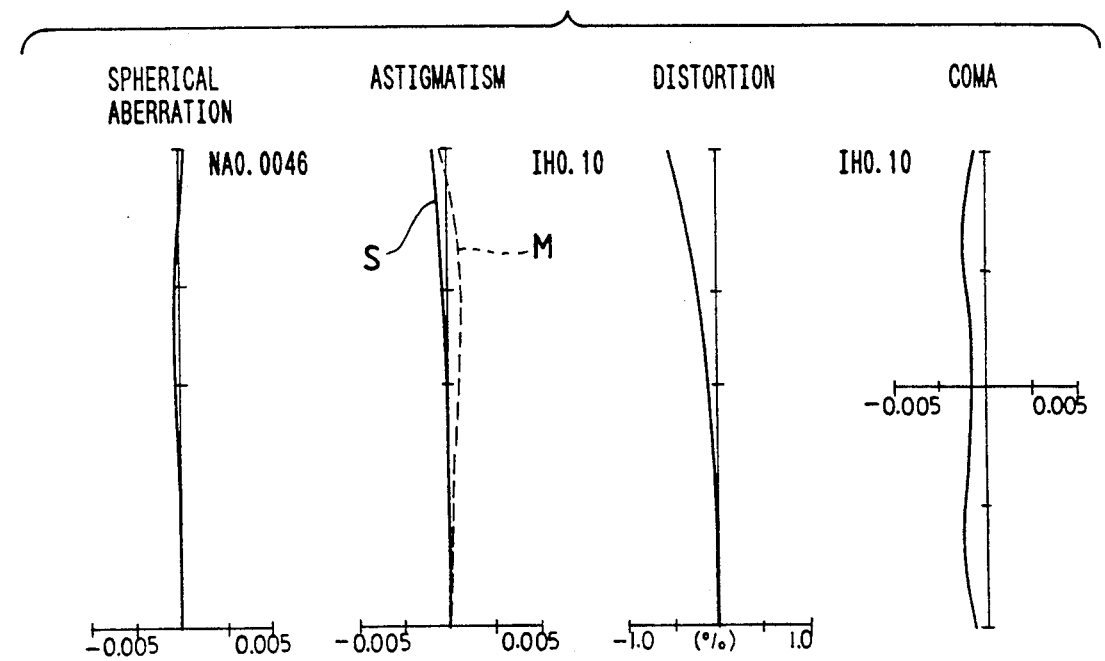
Figure 47:
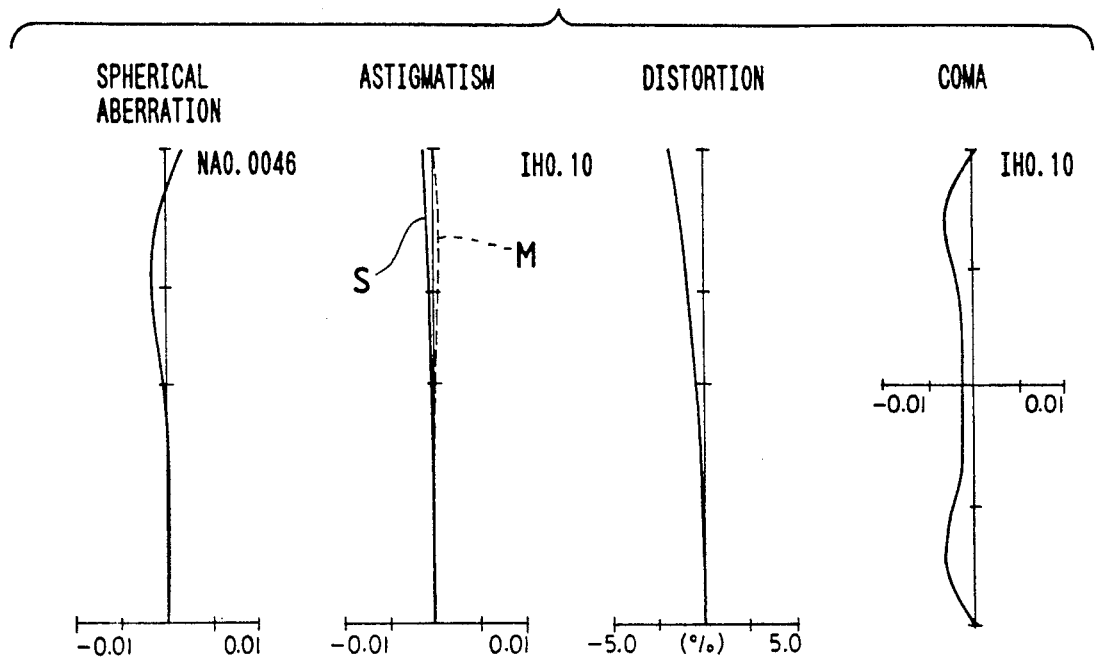
Figure 48:
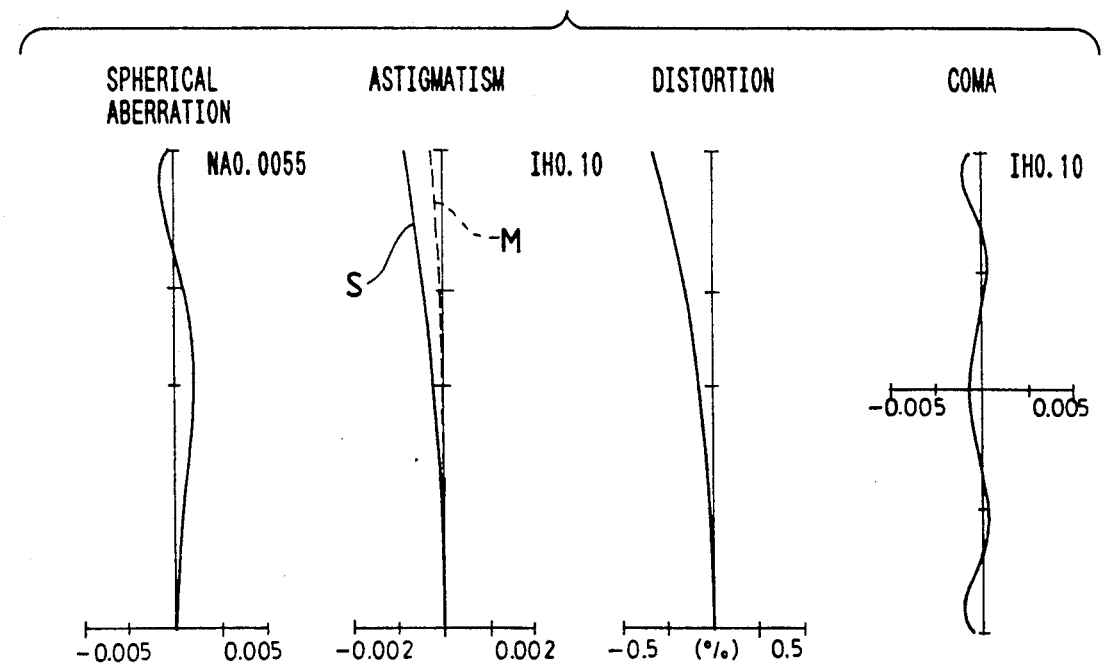
Figure 49:
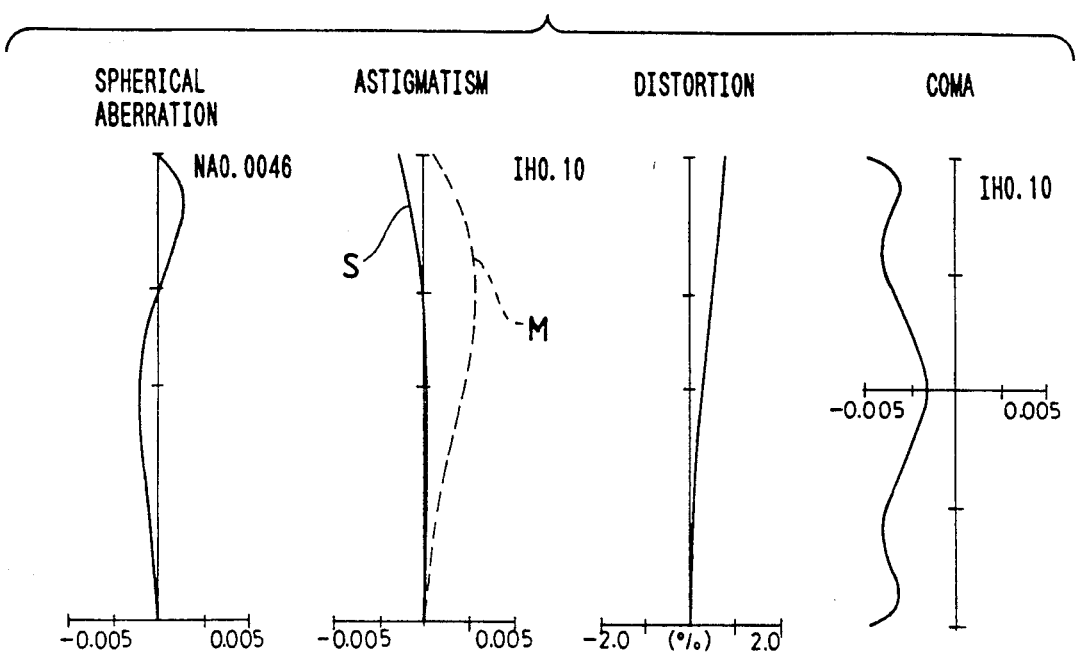
Figure 50:
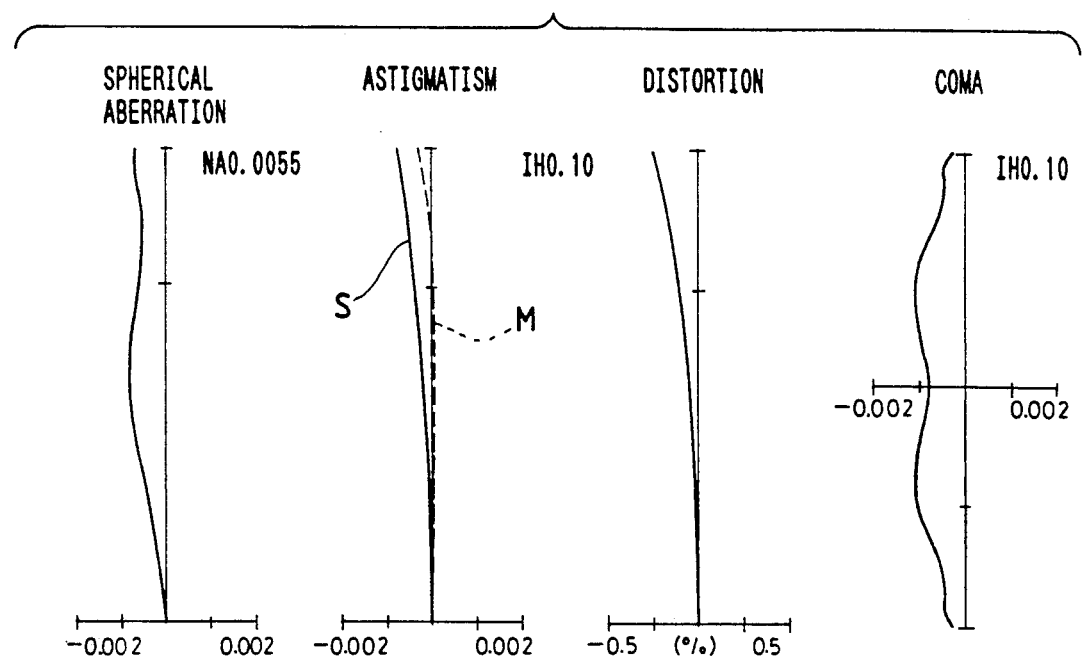

In the Embodiment having the composition illustrated in FIG. 19, a concave aspherical surface is adopted for providing an advantage for lens manufacturing.

In each of the Embodiments 15 through 19 described above, the two positive lens elements arranged on the eye side compose a lens component.

The Embodiments 20 through 23 have the compositions shown in FIG. 20 through FIG. 23 respectively and designed on the basis of the Tessar type. In each of the Embodiments 20 through 23, a concave aspherical surface is used as the object side surface of the second lens element and a convex aspherical surface is adopted as the eye side surface of the third lens element. This concave aspherical surface satisfies the conditions (11), (16) and (17). Further, the convex aspherical surface satisfies the condition (12).

Unlike the Embodiments 15 through 19, the Embodiments 20 through 23 use cemented doublets which are arranged on the object side for favorably correcting chromatic aberration of coma.

The eyepiece lens system for endoscopes preferred as the Embodiment 23 has a short total length and is compact. In contrast, the eyepiece lens system preferred as the Embodiment 22 has a long total length, but is composed of lens components having weak powers so that the optical performance of the lens system is adversely influenced by eccentricity caused at the assembling stage. Further, in the Embodiments 20 through 23, the aspherical surfaces are arranged at the locations far from the aperture stops, whereby the offaxial aberrations are corrected favorably.

The Embodiment 24 uses a negative lens component consisting of a cemented doublet having an eye side surface which is designed as a concave aspherical surface satisfying the conditions (11) and (16). Further, the convex aspherical surface used in the Embodiment 24 satisfies the condition (12).

The eyepiece lens system for endoscopes preferred as the Embodiment 24 is composed of lens components which have weak powers and can easily be manufactured in practice.

In the third type of the eyepiece lens system for endoscopes according to the present invention, a convex aspherical surface which has portions progressively strengthening the converging power for the rays as said portions are farther from the optical axis may be arranged at a location far from the aperture stop, for correcting coma of the upper ray, in place of the concave aspherical surface which has portions progressively weakening the diverging power for the rays as said portions are farther from the optical axis.

The Embodiment 25 adopts the convex aspherical surface described above. Speaking more concretely, the Embodiment 25 uses, on the lens component arranged on the object side therein, an aspherical surface having the convex shape and satisfying the following condition (18):

$$(N-N')\cdot A_{pp} < 0 \qquad (18)$$

wherein the reference symbol $A_{pp}$ represents any one of the coefficients E, F, G, ... of said convex aspherical surface which should satisfy the above-mentioned condition. That is to say, it is sufficient that the condition (18) is satisfied by any one of the coefficients mentioned above. The concave aspherical surface arranged on the negative lens component of the Embodiment 25 is adopted for reducing Petzval's sum and designed so as to satisfy the condition (16).

In addition, the above-mentioned condition (18) has the significance which is substantially the same as that of the condition (11). In other words, the convex aspherical surface to be used in the eyepiece lens system composed of the three lens components should desirably satisfy the condition (11) or the condition (18) dependently on the location selected for said convex aspherical surface.

In the Embodiments 14 through 25 described above, the lens component arranged on the object side is designed as a biconvex lens component for correcting coma.

The aspherical lens elements to be used in the eyepiece lens system for endoscopes according to the present invention can be manufactured relatively easily by molding glass and plastic materials. Further, it is possible to arrange the lens elements in alignment with correct airspaces reserved therebetween by designing the lens elements so as to have the function of a lens barrel at the marginal portions thereof as illustrated in FIG. 52 through FIG. 53. Out of these drawings, FIG. 52 shows a lens element $L_3$ which has an outer circumference lengthened so that it is brought into contact with another lens element $L_4$ and serve as a spacer. FIG. 53 shows a different type of concave lens element $L_3$ which has a step at the edge thereof for fitting a lens element $L_4$ therein. Further, FIG. 54 shows lens elements $L_3$ and $L_4$ both of which are stepped for assembling these lens elements with each other.

We claim:

1. An endoscope observation system comprising an image guide and an eyepiece lens system, said eyepiece lens system comprising, in order from the eye side:

a first lens unit having a positive refractive power, and a second lens unit having a negative refractive power; wherein said second lens unit comprises a concave aspherical surface satisfying the following condition, and said second lens unit satisfies one of the conditions (A) and (B):

$$x = Cy^2/\{1 + \sqrt{1 - PC^2y^2}\} + By^2 + Ey^4 + Fy^6 + Gy^8 + \ldots$$

(A) $(N - N')A_n < 0$
(B) $(N - N')B_n < 0, A_n = 0$ wherein an optical axis of the eyepiece lens system is taken as the x axis, a direction perpendicular to the optical axis is taken as the y axis, an intersection between the aspherical surface and the optical axis is taken as an origin on a coordinate system, the reference symbol C represents curvature on a spherical surface in contact with the aspherical surface on the optical axis, the reference symbol P designates a conical coefficient, the reference symbols B, E, F, G, ... denote aspherical surface coefficients of the second order, fourth order, sixth order, eighth order, ..., the reference symbol N represents a refractive index of a medium located on the eye side of the aspherical surface, the reference symbol N' designates a refractive index of a medium located on the object side of the aspherical surface, the reference symbol $A_n$ denotes any one of aspherical surface coefficients of the fourth and higher orders, and the reference symbol $B_n$ represents an aspherical surface coefficient of the second order, the suffix n having a meaning that the aspherical surface coefficient relates to an aspherical surface having a concave shape.

2. An observation endoscope system comprising an image guide and an eyepiece lens system, said eyepiece lens system comprising:

a first lens unit having a positive refractive power,
a second lens unit having a negative refractive power, and
a third lens unit having a positive refractive power; and
wherein said eyepiece lens system comprises a concave aspherical surface expressed by the formula shown below, and said eyepiece lens system satisfies the following condition:

$$x = Cy^2/\{1 + \sqrt{1 - PC^2y^2}\} + By^2 + Ey^4 + Fy^6 + Gy^8 + \ldots$$

$$(N - N')A_n < 0$$

wherein an optical axis of the eyepiece lens system is taken as the x axis, a direction perpendicular to the optical axis is taken as the y axis, an intersection between the aspherical surface and the optical axis is taken as an origin on a coordinate system, the reference symbol C represents curvature of a spherical surface in contact with the aspherical surface on the optical axis, the reference symbol P designates a conical coefficient, the reference symbols B, E, F, G, ... denote aspherical surface coefficients of the second order, fourth order, sixth order, eighth order, ..., the reference symbol N represents a refractive index of a medium located on an eye side of the aspherical surface, the reference symbol N' designates a refractive index of a medium located on an object side of the aspherical surface, and the reference symbol $A_n$ denotes any one of the aspherical surface coefficients of the fourth and higher orders, the suffix n meaning that the aspherical surface coefficient relates to an aspherical surface having a concave shape.

3. An endoscope observation system according to claim 1 or 2, wherein said eyepiece lens system further comprises a convex aspherical surface satisfying one of the following conditions (C) and (D):

$(N-N')A_p > 0$     (C)

$(N-N')B_p < 0, A_p = 0$     (D)

wherein the reference symbol $A_p$ represents any one of aspherical surface coefficients of the fourth and higher orders, and the reference symbol $B_p$ designates an aspherical surface coefficient of the second order of said convex aspherical surface, the suffix p having a meaning that the aspherical surface coefficient relates to an aspherical surface having a convex shape.

4. An eyepiece lens system for endoscopes according to claim 3 wherein an aspherical surface coefficient E of the fourth order of said convex aspherical surface has a value which is not zero and said convex aspherical surface satisfies the following condition:

$$0 < |E \cdot f^3| < 15$$

wherein the reference symbol f represents a focal length of said eyepiece lens system as a whole.

5. An eyepiece lens system for endoscopes comprising, in order from the eye side, a first lens unit having a positive refractive power and a second lens unit having a negative refractive power;

wherein said first lens unit comprises two positive lens components, said second lens unit comprises a biconcave lens component and a positive lens component, and an object side surface of said biconcave lens component being an aspherical surface that is expressed by the formula below and said biconcave lens component satisfying one of the following conditions (A) and (B) and the following condition (C):

$$x = Cy^2/\{1 + \sqrt{1 - PC^2y^2}\} + By^2 + Ey^4 + Fy^6 + Gy^8 + \ldots$$

(A) $(N - N')A_n < 0$
(B) $(N - N')B_n < 0, A_n = 0$
(C) $0.05f < R_n < 1.2f$,      $1/R_n = 1/R_i + 2B_n$ wherein an optical axis of the eyepiece lens system is taken as the x axis, a direction perpendicular to the optical axis is taken as the y axis, an intersection between the aspherical surface and the optical axis is taken as an origin on a coordinate system, the reference symbol C represents curvature on a spherical surface in contact with the aspherical surface on the optical axis, the reference symbol P designates a conical coefficient, the reference symbols B, E, F, G, ... denote aspherical surface coefficients of the second order, fourth order, sixth order, eighth order, ..., the reference symbol N represents a refractive index of a medium located on the eye side of the aspherical surface, the reference symbol N' designates a refractive index of a medium located on the object side of the aspherical surface, the reference symbol $A_n$ denotes any one of the aspherical surface coefficients of the fourth and higher orders, the reference symbol $B_n$ represents an aspherical surface coefficient of the second order, the suffix n having a meaning that the aspherical surface coefficient relates to an aspherical surface having a concave shape, the reference symbol $R_i$ represents a radius of curvature on the object side surface of biconcave lens components, and the reference symbol f denotes a focal length of said eyepiece lens system as a whole.

6. An eyepiece lens system for endoscopes according to claim 5 wherein said concave aspherical surface satisfies the following condition:

$$(N-N')\cdot E_n > 0$$

wherein the reference symbol $E_n$ represents the coefficient of the fourth order of the concave aspherical surface.

7. An eyepiece lens system for endoscopes according to claim 5, wherein said concave aspherical satisfies the following condition:

$$(N-N')\cdot E_n > 0$$

wherein the reference symbol $E_n$ represents the coefficient of the fourth order of the concave aspherical surface.

8. An eyepiece lens system for endoscopes according to claim 5 wherein the positive lens component arranged in said second lens unit has an aspherical eye side surface.

9. An eyepiece lens system for endoscopes comprising, in the order from the eye side, a first lens unit having a positive refractive power, a second lens unit having a negative refractive power, and a third lens unit having a positive refractive power;

wherein said first lens unit comprises a positive lens component, said second lens unit comprises a biconcave lens component, said third lens unit comprises a positive cemented lens component, and the object side surface of said biconcave lens component is an aspherical surface expressed by the following formula, and said biconcave lens component satisfies the following conditions (A) and (B):

$$x = Cy^2/\{1 + \sqrt{1 - PC^2y^2}\} + By^2 + Ey^4 + Fy^6 + Gy^8 + \ldots$$

(A) $(N - N')A_n < 0$ (B) $0.05f < R_n < 1.2f,\quad 1/R_n = 1/R_i + 2B_n$ wherein an optical axis of the eyepiece lens system is taken as the x axis, a direction perpendicular to the optical axis is taken as the y axis, an intersection between the aspherical surface and the optical axis is taken as an original on a coordinate system, the reference symbol C represents curvature on a spherical surface in contact with the aspherical surface on the optical axis, the reference symbol P designates a conical coefficient, the reference symbols B, E, F, G, ... denote aspherical surface coefficients of the second order, fourth order, sixth order, eighth order, ..., the reference symbol N represents a refractive index of a medium located on the eye side of the aspherical surface, the reference symbol N' designates a refractive index of a medium located on the object side of the aspherical surface, the reference symbol $A_n$ denotes any one of aspherical surface coefficients of the fourth and higher orders, the reference symbol $B_n$ represents an aspherical surface coefficient of the second order, the suffix n having a meaning that the aspherical surface coefficient relates to an aspherical surface having a concave shape, the reference symbol $R_i$ represents a radius of curvature on the object side surface of said biconcave lens components, and the reference symbol f denotes a focal length of said eyepiece lens system as a whole.

10. An eyepiece lens system for endoscopes according to claim 9 wherein said concave aspherical surface satisfies the following condition:

$$(N-N')\cdot E_n > 0$$

wherein the reference symbol $E_n$ represents a coefficient of the fourth order of said concave aspherical surface.

11. An eyepiece lens system for endoscopes comprising, in order from the eye side, a first lens unit having a positive refractive power, a second lens unit having a negative refractive power, and a third lens unit having a positive refractive power, wherein said first lens unit comprises a positive lens component, said second lens unit comprises a cemented lens component having a concave surface on the eye side, said third lens unit comprises a positive lens component, said concave surface of the second lens unit is an aspherical surface, which is expressed by the following formula, and said cemented lens component satisfies the following condition (A) and (B):

$$x = Cy^2/\{1 + \sqrt{1 - PC^2y^2}\} + By^2 + Ey^4 + Fy^6 + Gy^8 + \ldots$$

(A) $(N - N')A_n < 0$ (B) $0.05f < R_n < 1.2f,\quad 1/R_n = 1/R_i + 2B_n$ wherein an optical axis of the eyepiece lens system is taken as the x axis, a direction perpendicular to the optical axis is taken as the y axis, an intersection between the aspherical surface and the optical axis is taken as an origin on a coordinate system, the reference symbol C represents curvature on a spherical surface in contact with the aspherical surface on the optical axis, the reference symbol P designates a conical coefficient, the reference symbols B, E, F, G, ... denote aspherical surface coefficients of the second order, fourth order, sixth order, eighth order, ..., the reference symbol N represents a refractive index of a medium located on the eye side of the aspherical surface, the reference symbol N' designates a refractive index of a medium located on the object side of the aspherical surface, the reference symbol $A_n$ denotes any one of aspherical surface coefficients of the fourth and higher orders, the reference symbol $B_n$ represents an aspherical surface coefficient of the second order, the suffix n having a meaning that the aspherical surface coefficient relates to an aspherical surface having a concave shape, the reference symbol $R_i$ represents a radius of curvature on the concave surface of said second lens unit, and the reference symbol f denotes a focal length of said eyepiece lens system as a whole.

12. An eyepiece lens system for endoscopes according to claim 11 wherein said concave aspherical surface satisfies the following condition:

$$(N-N')\cdot E_n > 0$$

wherein the reference symbol E represents a coefficient of the fourth order of said concave aspherical surface.

13. An eyepiece lens system for endoscopes according to claim 12 wherein an eye side surface of the positive lens component of said third lens unit is an aspherical surface satisfying the following condition:

$$(N-N')\cdot A_p > 0$$

wherein the reference symbol $A_p$ represents any one of aspherical surface coefficients of the fourth and higher orders, the suffix p having a meaning that the aspherical surface relates to an aspherical surface having a convex shape.

14. An eyepiece lens system for endoscopes according to claim 10 wherein said positive cemented lens components has a convex surface on the eye side which is an aspherical surface satisfying the following condition:

$$(N-N')\cdot A_{pp} > 0$$

wherein the reference symbol $A_{pp}$ represents any one of aspherical surface coefficients of the fourth and higher orders, the suffix pp having a meaning that the aspherical surface coefficient relates to an aspherical surface having a convex shape.

* * * * *